US012634920B2

(12) United States Patent
Babbellapati et al.

(10) Patent No.: US 12,634,920 B2
(45) Date of Patent: May 19, 2026

(54) BROADCAST TRAFFIC SCHEDULING ACROSS MULTIPLE RADIO ACCESS TECHNOLOGIES

(71) Applicant: QUALCOMM Incorporated, San Diego, CA (US)

(72) Inventors: Syam Krishna Babbellapati, Chennai (IN); Sitaramanjaneyulu Kanamarlapudi, San Diego, CA (US); Prasad Reddy Kadiri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 469 days.

(21) Appl. No.: 17/940,377

(22) Filed: Sep. 8, 2022

(65) Prior Publication Data

US 2024/0089947 A1     Mar. 14, 2024

(51) Int. Cl.

| | |
|---|---|
| *H04W 72/30* | (2023.01) |
| *H04W 4/06* | (2009.01) |
| *H04W 48/02* | (2009.01) |
| *H04W 48/08* | (2009.01) |
| *H04W 72/121* | (2023.01) |
| *H04W 72/20* | (2023.01) |

(52) U.S. Cl.
CPC ........... *H04W 72/121* (2013.01); *H04W 4/06* (2013.01); *H04W 48/02* (2013.01); *H04W 48/08* (2013.01); *H04W 72/20* (2023.01)

(58) Field of Classification Search
CPC .............. H04W 72/121; H04W 72/20; H04W 72/30; H04W 4/06; H04W 48/02; H04W 48/08; H04L 12/1877; H04L 12/189

USPC ......................................................... 370/312
See application file for complete search history.

(56) References Cited

U.S. PATENT DOCUMENTS

| | | | | |
|---|---|---|---|---|
| 11,012,932 B2* | 5/2021 | Gan | .................. | H04W 52/0206 |
| 11,197,050 B2* | 12/2021 | Gunasekara | ....... | H04N 21/2393 |
| 11,201,839 B2* | 12/2021 | Hoole | ................. | H04L 47/2441 |
| 11,304,037 B2* | 4/2022 | Fechtel | ................... | H04W 8/08 |
| 12,004,147 B2* | 6/2024 | Shah | .................... | H04W 72/21 |

(Continued)

OTHER PUBLICATIONS

ETSI TS 123 247 V17.3.0 (Jul. 2022) 5G; Architectural enhancements for 5G multicast-broadcast services (Year: 2022).*

(Continued)

*Primary Examiner* — Christopher M Crutchfield
*Assistant Examiner* — Syed Ahmed
(74) *Attorney, Agent, or Firm* — Holland & Hart LLP

(57) ABSTRACT

Methods, systems, and devices for wireless communications are described that provide for broadcast communications that originate at a wide area network to be provided to a local area network (LAN), that uses a different radio access technology, to complete the broadcast communications to a user equipment (UE). A device that receives the broadcast communications, such as a customer premises equipment (CPE) may decode broadcast data from the broadcast communications and provide the broadcast data to a LAN scheduler along with one or more parameters associated with the broadcast data. The LAN scheduler may establish a separate background access category (AC) queue for the broadcast data, and may transmit data from the broadcast AC queue based on one or more threshold values.

30 Claims, 16 Drawing Sheets

(56)                    References Cited

U.S. PATENT DOCUMENTS

| | | | |
|---|---|---|---|
| 2014/0219157 A1 | 8/2014 | Sukumar et al. | |
| 2022/0124043 A1* | 4/2022 | Zhu | H04L 47/2475 |
| 2022/0225323 A1* | 7/2022 | Wang | H04W 72/56 |
| 2023/0063082 A1* | 3/2023 | Zhou | H04W 72/30 |
| 2023/0224889 A1* | 7/2023 | Zhao | H04W 72/121 |
| | | | 370/329 |
| 2023/0308938 A1* | 9/2023 | Sun | H04W 76/20 |
| 2024/0089826 A1* | 3/2024 | Babbellapati | H04W 40/04 |
| 2024/0147192 A1* | 5/2024 | Legallais | H04W 76/40 |

OTHER PUBLICATIONS

Huawei., et al., "Compromise Solution for 3GPP WLAN Radio Interworking", 3GPP TSG-RAN WG Meeting #84, R2-134258, Compromise Solution for 3GPP Wlan Radio Interworking, 3rd Generation Partnership Project, Mobile Competence Centre, 650, Route Des Lucioles, F-06921 Sophia-Antipolis Cedex, France, vol. TSG RAN, No. San Francisco, USA, Nov. 11, 2013-Nov. 15, 2013, Nov. 13, 2013, 5 pages, XP050736999, The Whole Document.
Partial International Search Report—PCT/US2023/072528—ISA/EPO—Dec. 14, 2023.
International Search Report and Written Opinion—PCT/US2023/072528—ISA/EPO—Feb. 5, 2024.

* cited by examiner

500

130      105      115

Network Entity

Transceiver

1010

Antenna

1015

Communications Manager

1020

Memory

Code

1030

1025

1040

Processor

1035

1005

1000

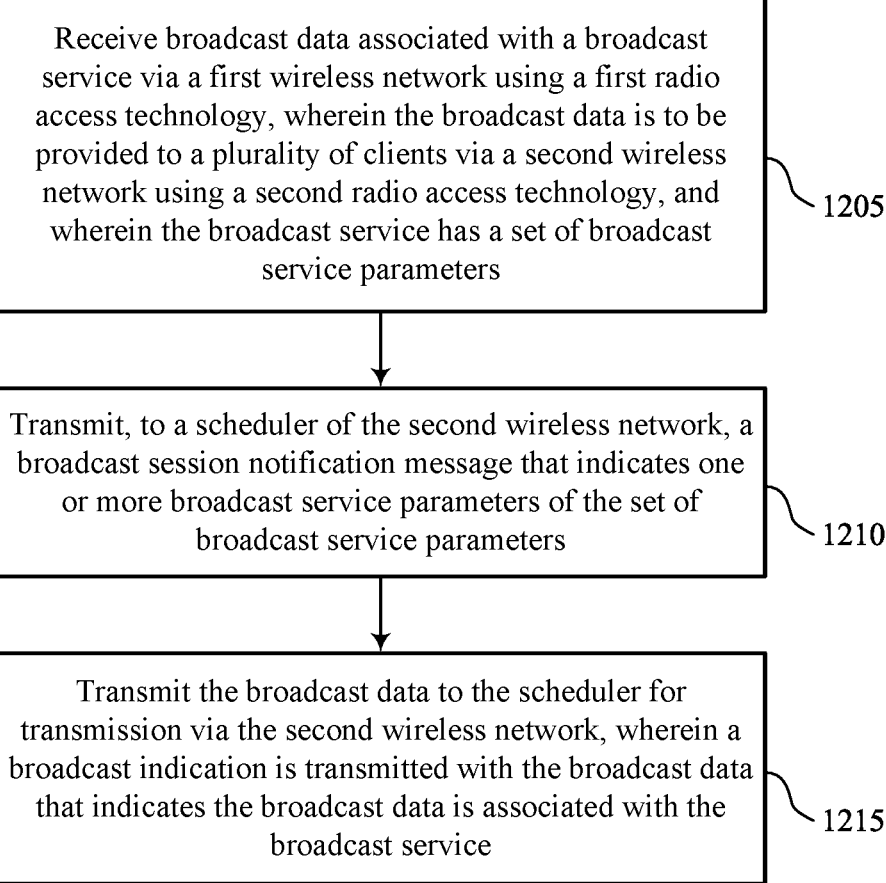

Receive broadcast data associated with a broadcast service via a first wireless network using a first radio access technology, wherein the broadcast data is to be provided to a plurality of clients via a second wireless network using a second radio access technology, and wherein the broadcast service has a set of broadcast service parameters

1205

Transmit, to a scheduler of the second wireless network, a broadcast session notification message that indicates one or more broadcast service parameters of the set of broadcast service parameters

1210

Transmit the broadcast data to the scheduler for transmission via the second wireless network, wherein a broadcast indication is transmitted with the broadcast data that indicates the broadcast data is associated with the broadcast service

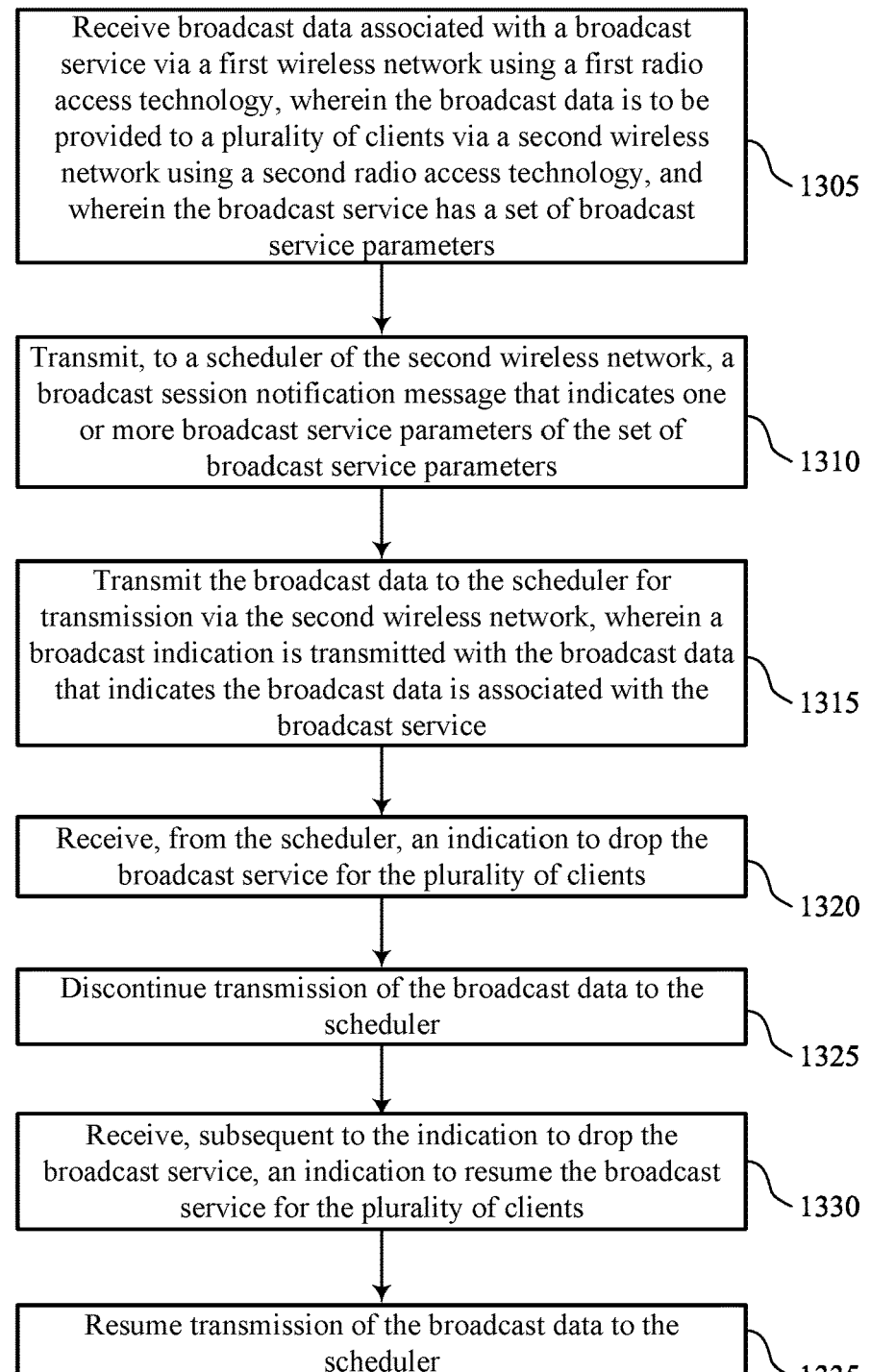

Receive broadcast data associated with a broadcast service via a first wireless network using a first radio access technology, wherein the broadcast data is to be provided to a plurality of clients via a second wireless network using a second radio access technology, and wherein the broadcast service has a set of broadcast service parameters ⟍1305

Transmit, to a scheduler of the second wireless network, a broadcast session notification message that indicates one or more broadcast service parameters of the set of broadcast service parameters ⟍1310

Transmit the broadcast data to the scheduler for transmission via the second wireless network, wherein a broadcast indication is transmitted with the broadcast data that indicates the broadcast data is associated with the broadcast service ⟍1315

Receive, from the scheduler, an indication to drop the broadcast service for the plurality of clients ⟍1320

Discontinue transmission of the broadcast data to the scheduler ⟍1325

Receive, subsequent to the indication to drop the broadcast service, an indication to resume the broadcast service for the plurality of clients ⟍1330

Resume transmission of the broadcast data to the scheduler ⟍1335

FIG. 13          ⟍1300

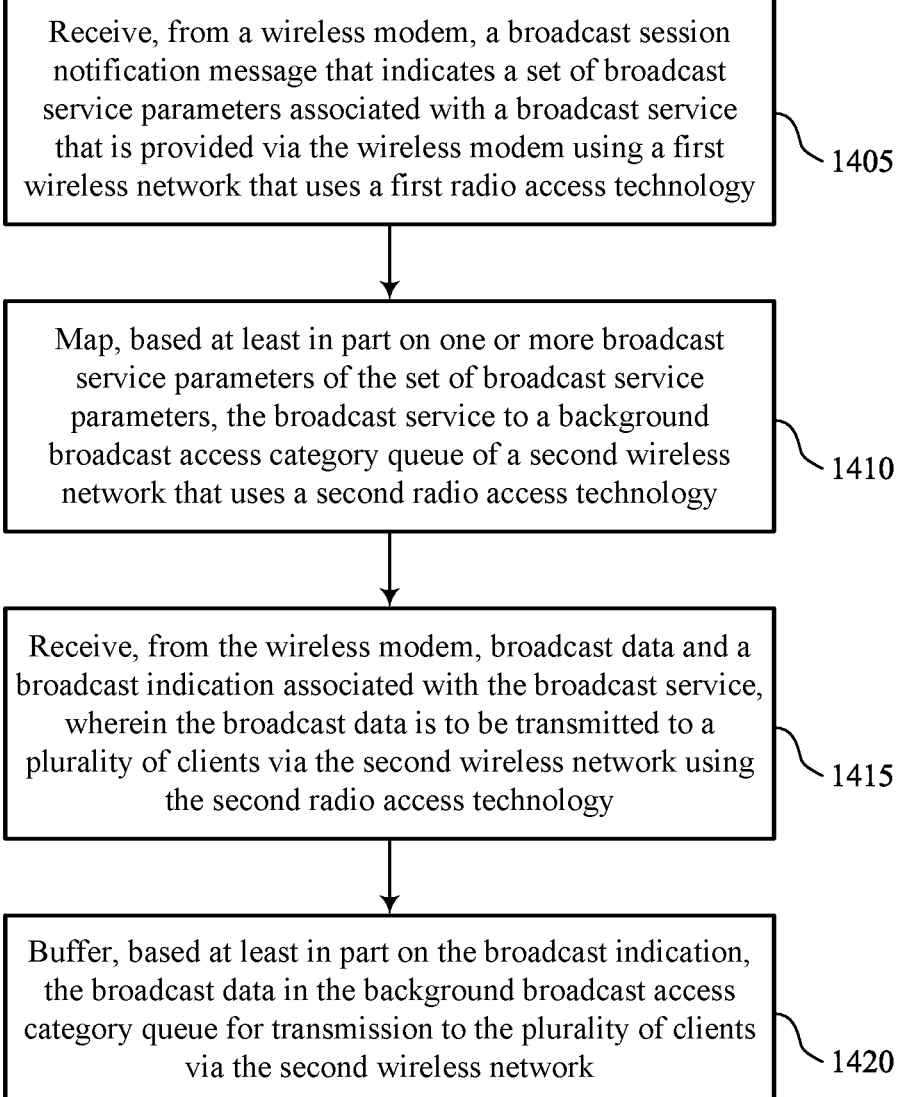

Receive, from a wireless modem, a broadcast session notification message that indicates a set of broadcast service parameters associated with a broadcast service that is provided via the wireless modem using a first wireless network that uses a first radio access technology

1405

Map, based at least in part on one or more broadcast service parameters of the set of broadcast service parameters, the broadcast service to a background broadcast access category queue of a second wireless network that uses a second radio access technology

1410

Receive, from the wireless modem, broadcast data and a broadcast indication associated with the broadcast service, wherein the broadcast data is to be transmitted to a plurality of clients via the second wireless network using the second radio access technology

1415

Buffer, based at least in part on the broadcast indication, the broadcast data in the background broadcast access category queue for transmission to the plurality of clients via the second wireless network

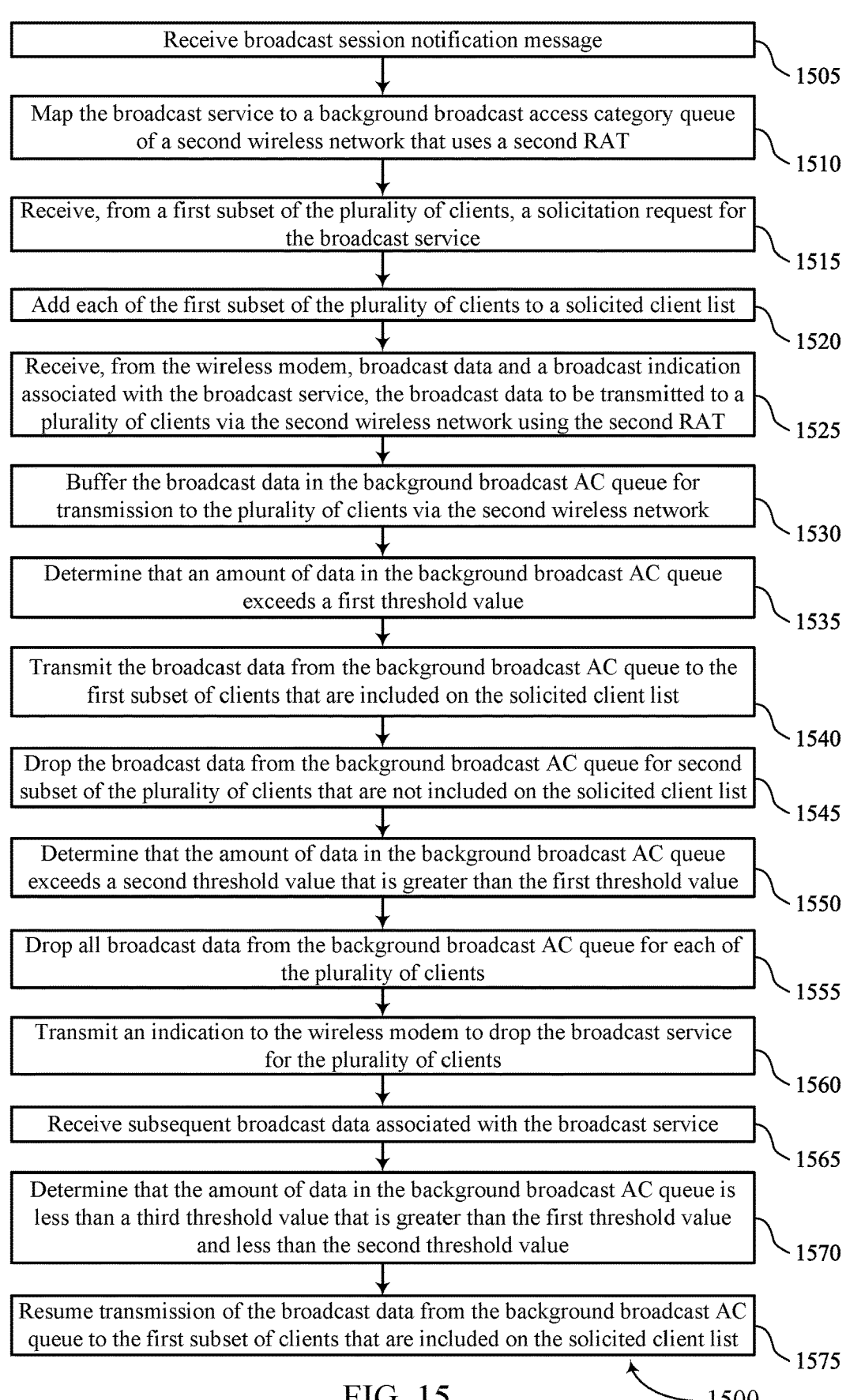

Receive broadcast session notification message
1505

Map the broadcast service to a background broadcast access category queue of a second wireless network that uses a second RAT
1510

Receive, from a first subset of the plurality of clients, a solicitation request for the broadcast service
1515

Add each of the first subset of the plurality of clients to a solicited client list
1520

Receive, from the wireless modem, broadcast data and a broadcast indication associated with the broadcast service, the broadcast data to be transmitted to a plurality of clients via the second wireless network using the second RAT
1525

Buffer the broadcast data in the background broadcast AC queue for transmission to the plurality of clients via the second wireless network
1530

Determine that an amount of data in the background broadcast AC queue exceeds a first threshold value
1535

Transmit the broadcast data from the background broadcast AC queue to the first subset of clients that are included on the solicited client list
1540

Drop the broadcast data from the background broadcast AC queue for second subset of the plurality of clients that are not included on the solicited client list
1545

Determine that the amount of data in the background broadcast AC queue exceeds a second threshold value that is greater than the first threshold value
1550

Drop all broadcast data from the background broadcast AC queue for each of the plurality of clients
1555

Transmit an indication to the wireless modem to drop the broadcast service for the plurality of clients
1560

Receive subsequent broadcast data associated with the broadcast service
1565

Determine that the amount of data in the background broadcast AC queue is less than a third threshold value that is greater than the first threshold value and less than the second threshold value
1570

Resume transmission of the broadcast data from the background broadcast AC queue to the first subset of clients that are included on the solicited client list
1575

FIG. 15 1500

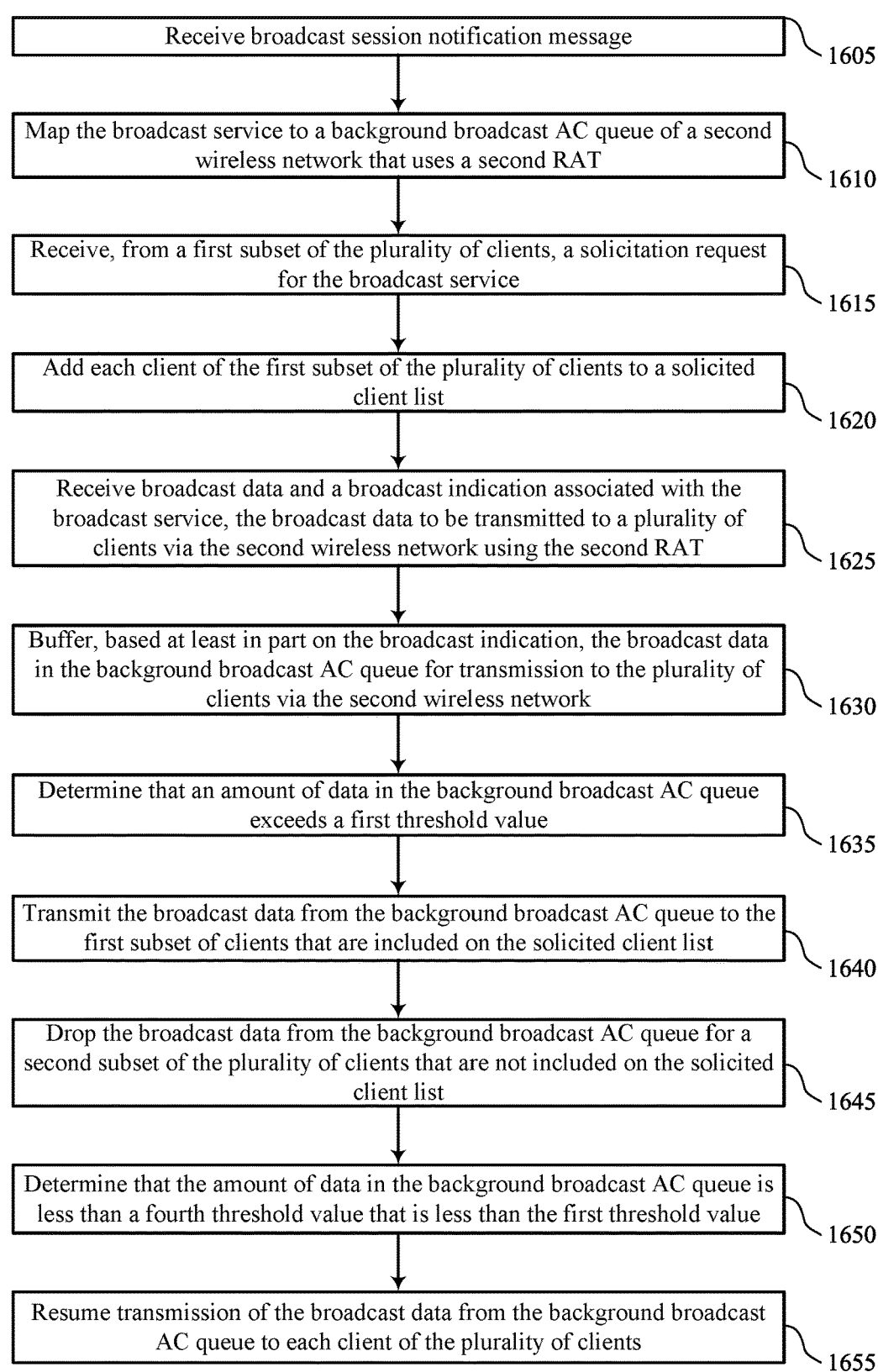

Receive broadcast session notification message 1605

Map the broadcast service to a background broadcast AC queue of a second wireless network that uses a second RAT 1610

Receive, from a first subset of the plurality of clients, a solicitation request for the broadcast service 1615

Add each client of the first subset of the plurality of clients to a solicited client list 1620

Receive broadcast data and a broadcast indication associated with the broadcast service, the broadcast data to be transmitted to a plurality of clients via the second wireless network using the second RAT 1625

Buffer, based at least in part on the broadcast indication, the broadcast data in the background broadcast AC queue for transmission to the plurality of clients via the second wireless network 1630

Determine that an amount of data in the background broadcast AC queue exceeds a first threshold value 1635

Transmit the broadcast data from the background broadcast AC queue to the first subset of clients that are included on the solicited client list 1640

Drop the broadcast data from the background broadcast AC queue for a second subset of the plurality of clients that are not included on the solicited client list 1645

Determine that the amount of data in the background broadcast AC queue is less than a fourth threshold value that is less than the first threshold value 1650

Resume transmission of the broadcast data from the background broadcast AC queue to each client of the plurality of clients 1655

BROADCAST TRAFFIC SCHEDULING ACROSS MULTIPLE RADIO ACCESS TECHNOLOGIES

FIELD OF TECHNOLOGY

The following relates to wireless communications, including broadcast traffic scheduling across multiple radio access technologies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some deployments, a UE may be capable of radio communications using two or more radio access technologies (RATs). For example, a UE may be capable of wireless communications using wide area network (WAN) such as 4G or 5G wireless communications systems, and also a wireless local area network (WLAN) such as a Wi-Fi (i.e., Institute of Electrical and Electronics Engineers (IEEE) 802.11) network. In some cases, a communication may be transmitted using multiple networks, such as a communication that originates at a WAN and is competed using a WLAN. Efficient techniques for communications across multiple RATs may help to improve throughput, reliability, and user experience.

SUMMARY

The described techniques relate to improved methods, systems, devices, and apparatuses that support broadcast traffic scheduling across multiple radio access technologies. In various aspects, described techniques provide for broadcast communications that originate at a wide area network using a first RAT, such as a fifth generation (5G) wireless communications network, to be provided to a local area network that uses a second RAT, such as a Wi-Fi network, that is used to complete the broadcast communications to a user equipment (UE) or multiple UEs. In some aspects, a device that receives the broadcast communications, such as a customer premises equipment (CPE), via the first RAT may decode broadcast data from the broadcast communications and provide the broadcast data to a scheduler of the second RAT along with one or more parameters associated with the broadcast data.

The scheduler of the second RAT may establish a separate background access category (AC) queue for the broadcast data, and may transmit data from the broadcast AC queue based on one or more threshold values. In some cases, if an amount of data in the broadcast AC queue exceeds a first threshold, the scheduler of the second RAT may discontinue broadcast transmissions to UEs that did not solicit the broadcast service, and transmit only to UEs that did solicit the service. Further, if the amount of data in the broadcast AC queue exceeds a second threshold (e.g., that is greater than the first threshold), the scheduler of the second RAT may discontinue all broadcast transmissions, and provide a notice to a modem for the first RAT. In some cases, the modem of the first RAT may transmit the broadcast data to the UEs, or another network entity in the wide area network may transmit the broadcast data to the UEs. In some cases, the threshold values for the broadcast AC queue may be based on broadcast service parameters, such as a number of solicited clients, quality of service (QoS) parameters (e.g., 5QI parameters and associated thresholds), or bandwidth of the traffic (e.g., whether the bandwidth is above or below a threshold value). The scheduler of the second RAT may receive the broadcast-related information and prioritize the broadcast traffic accordingly, which can enhance efficiency and provide MBS services with appropriate quality.

A method for wireless communication is described. The method may include receiving broadcast data associated with a broadcast service via a first wireless network using a first radio access technology, where the broadcast data is to be provided to a set of multiple clients via a second wireless network using a second radio access technology, and where the broadcast service has a set of broadcast service parameters, transmitting, to a scheduler of the second wireless network, a broadcast session notification message that indicates one or more broadcast service parameters of the set of broadcast service parameters, and transmitting the broadcast data to the scheduler for transmission via the second wireless network, where a broadcast indication is transmitted with the broadcast data that indicates the broadcast data is associated with the broadcast service.

An apparatus for wireless communication is described. The apparatus may include a processor, memory coupled with the processor, and instructions stored in the memory. The instructions may be executable by the processor to cause the apparatus to receive broadcast data associated with a broadcast service via a first wireless network using a first radio access technology, where the broadcast data is to be provided to a set of multiple clients via a second wireless network using a second radio access technology, and where the broadcast service has a set of broadcast service parameters, transmit, to a scheduler of the second wireless network, a broadcast session notification message that indicates one or more broadcast service parameters of the set of broadcast service parameters, and transmit the broadcast data to the scheduler for transmission via the second wireless network, where a broadcast indication is transmitted with the broadcast data that indicates the broadcast data is associated with the broadcast service.

Another apparatus for wireless communication is described. The apparatus may include means for receiving broadcast data associated with a broadcast service via a first wireless network using a first radio access technology, where the broadcast data is to be provided to a set of multiple clients via a second wireless network using a second radio access technology, and where the broadcast service has a set of broadcast service parameters, means for transmitting, to a scheduler of the second wireless network, a broadcast session notification message that indicates one or more broadcast service parameters of the set of broadcast service parameters, and means for transmitting the broadcast data to the scheduler for transmission via the second wireless network, where a broadcast indication is transmitted with the broadcast data that indicates the broadcast data is associated with the broadcast service.

A non-transitory computer-readable medium storing code for wireless communication is described. The code may include instructions executable by a processor to receive broadcast data associated with a broadcast service via a first wireless network using a first radio access technology, where the broadcast data is to be provided to a set of multiple clients via a second wireless network using a second radio access technology, and where the broadcast service has a set of broadcast service parameters, transmit, to a scheduler of the second wireless network, a broadcast session notification message that indicates one or more broadcast service parameters of the set of broadcast service parameters, and transmit the broadcast data to the scheduler for transmission via the second wireless network, where a broadcast indication is transmitted with the broadcast data that indicates the broadcast data is associated with the broadcast service.

Some examples of the method, apparatuses, and non-transitory computer-readable medium described herein may further include operations, features, means, or instructions for receiving, from the scheduler, an indication to drop the broadcast service for the set of multiple clients and discontinuing transmission of the broadcast data to the scheduler. Some examples of the method, apparatuses, and non-transitory computer-readable medium described herein may further include operations, features, means, or instructions for transmitting the broadcast data to the set of multiple clients using the first radio access technology. Some examples of the method, apparatuses, and non-transitory computer-readable medium described herein may further include operations, features, means, or instructions for receiving, subsequent to the indication to drop the broadcast service, an indication to resume the broadcast service for the set of multiple clients, resuming transmission of the broadcast data to the scheduler, and discontinuing transmission of the broadcast data to the set of multiple clients using the first radio access technology.

In some examples of the method, apparatuses, and non-transitory computer-readable medium described herein, the set of broadcast service parameters include one or more of a data rate target of the broadcast data, or an indication of whether the broadcast service is a solicited broadcast service or an unsolicited broadcast service. In some examples of the method, apparatuses, and non-transitory computer-readable medium described herein, the first wireless network may be a fifth generation (5G) or sixth generation (6G) radio access network and the second wireless network may be a wireless local area network (WLAN).

A method for wireless communication is described. The method may include receiving, from a wireless modem, a broadcast session notification message that indicates a set of broadcast service parameters associated with a broadcast service that is provided via the wireless modem using a first wireless network that uses a first radio access technology, mapping, based on one or more broadcast service parameters of the set of broadcast service parameters, the broadcast service to a background broadcast access category queue of a second wireless network that uses a second radio access technology, receiving, from the wireless modem, broadcast data and a broadcast indication associated with the broadcast service, where the broadcast data is to be transmitted to a set of multiple clients via the second wireless network using the second radio access technology, and buffering, based on the broadcast indication, the broadcast data in the background broadcast access category queue for transmission to the set of multiple clients via the second wireless network.

An apparatus for wireless communication is described. The apparatus may include a processor, memory coupled with the processor, and instructions stored in the memory. The instructions may be executable by the processor to cause the apparatus to receive, from a wireless modem, a broadcast session notification message that indicates a set of broadcast service parameters associated with a broadcast service that is provided via the wireless modem using a first wireless network that uses a first radio access technology, mapping, base at least in part on one or more broadcast service parameters of the set of broadcast service parameters, the broadcast service to a background broadcast access category queue of a second wireless network that uses a second radio access technology, receive, from the wireless modem, broadcast data and a broadcast indication associated with the broadcast service, where the broadcast data is to be transmitted to a set of multiple clients via the second wireless network using the second radio access technology, and buffering, base at least in part on the broadcast indication, the broadcast data in the background broadcast access category queue for transmission to the set of multiple clients via the second wireless network.

Another apparatus for wireless communication is described. The apparatus may include means for receiving, from a wireless modem, a broadcast session notification message that indicates a set of broadcast service parameters associated with a broadcast service that is provided via the wireless modem using a first wireless network that uses a first radio access technology, means for mapping, based on one or more broadcast service parameters of the set of broadcast service parameters, the broadcast service to a background broadcast access category queue of a second wireless network that uses a second radio access technology, means for receiving, from the wireless modem, broadcast data and a broadcast indication associated with the broadcast service, where the broadcast data is to be transmitted to a set of multiple clients via the second wireless network using the second radio access technology, and means for buffering, based on the broadcast indication, the broadcast data in the background broadcast access category queue for transmission to the set of multiple clients via the second wireless network.

A non-transitory computer-readable medium storing code for wireless communication is described. The code may include instructions executable by a processor to receive, from a wireless modem, a broadcast session notification message that indicates a set of broadcast service parameters associated with a broadcast service that is provided via the wireless modem using a first wireless network that uses a first radio access technology, mapping, base at least in part on one or more broadcast service parameters of the set of broadcast service parameters, the broadcast service to a background broadcast access category queue of a second wireless network that uses a second radio access technology, receive, from the wireless modem, broadcast data and a broadcast indication associated with the broadcast service, where the broadcast data is to be transmitted to a set of multiple clients via the second wireless network using the second radio access technology, and buffering, base at least in part on the broadcast indication, the broadcast data in the background broadcast access category queue for transmission to the set of multiple clients via the second wireless network.

Some examples of the method, apparatuses, and non-transitory computer-readable medium described herein may further include operations, features, means, or instructions for receiving, from a first subset of the set of multiple clients, a solicitation request for the broadcast service and adding each client of the first subset of the set of multiple clients to a solicited client list. Some examples of the method, apparatuses, and non-transitory computer-readable medium described herein may further include operations, features, means, or instructions for determining that an amount of data in the background broadcast access category queue exceeds a first threshold value, transmitting the broadcast data from the background broadcast access category queue to the first subset of clients that are included on the solicited client list, and dropping the broadcast data from the background broadcast access category queue for a second subset of the set of multiple clients that are not included on the solicited client list.

Some examples of the method, apparatuses, and non-transitory computer-readable medium described herein may further include operations, features, means, or instructions for determining that the amount of data in the background broadcast access category queue exceeds a second threshold value, where the second threshold value is greater than the first threshold value, dropping all broadcast data from the background broadcast access category queue for each of the set of multiple clients, and transmitting an indication to the wireless modem to drop the broadcast service for the set of multiple clients. Some examples of the method, apparatuses, and non-transitory computer-readable medium described herein may further include operations, features, means, or instructions for receiving, subsequent to dropping all broadcast data, subsequent broadcast data associated with the broadcast service, determining that the amount of data in the background broadcast access category queue is less than a third threshold value, where the third threshold value is greater than the first threshold value and less than the second threshold value, and resuming transmission of the broadcast data from the background broadcast access category queue to the first subset of clients that are included on the solicited client list.

Some examples of the method, apparatuses, and non-transitory computer-readable medium described herein may further include operations, features, means, or instructions for determining, subsequent to dropping the broadcast data from the background broadcast access category queue for a second subset of the set of multiple clients, that the amount of data in the background broadcast access category queue is less than a fourth threshold value, where the fourth threshold value is less than the first threshold value and resuming transmission of the broadcast data from the background broadcast access category queue to each client of the set of multiple clients.

In some examples of the method, apparatuses, and non-transitory computer-readable medium described herein, the one or more broadcast service parameters include one or more of a quantity of clients of the second wireless network, a quantity of clients that have solicited the broadcast service, one or more quality of service parameters associated with the broadcast service, or a data rate target of the broadcast service. Some examples of the method, apparatuses, and non-transitory computer-readable medium described herein may further include operations, features, means, or instructions for determining one or more threshold values for transmitting the broadcast data to one or more of the set of multiple clients based on the one or more broadcast service parameters.

In some examples of the method, apparatuses, and non-transitory computer-readable medium described herein, the one or more threshold values include a first threshold value that indicates whether to transmit broadcast data to clients that have not solicited the broadcast service, and a second threshold value that indicates whether to discontinue transmission of the broadcast data to all of the set of multiple clients irrespective of whether the broadcast service was solicited. In some examples of the method, apparatuses, and non-transitory computer-readable medium described herein, the one or more threshold values may be adjusted based on a status of one or more other access category queues.

Some examples of the method, apparatuses, and non-transitory computer-readable medium described herein may further include operations, features, means, or instructions for scheduling data transmissions associated with the broadcast service using OFDMA or MU-MIMO based on an associated capability of each of the set of multiple clients and a data rate associated with the broadcast service being above a data rate threshold value. In some examples of the method, apparatuses, and non-transitory computer-readable medium described herein, the first wireless network may be a 5G or 6G radio access network and the second wireless network may be a WLAN.

BRIEF DESCRIPTION OF THE DRAWINGS

FIGS. 12 through 16 show flowcharts illustrating methods that support broadcast traffic scheduling across multiple radio access technologies in accordance with one or more aspects of the present disclosure.

DETAILED DESCRIPTION

Figure 1:
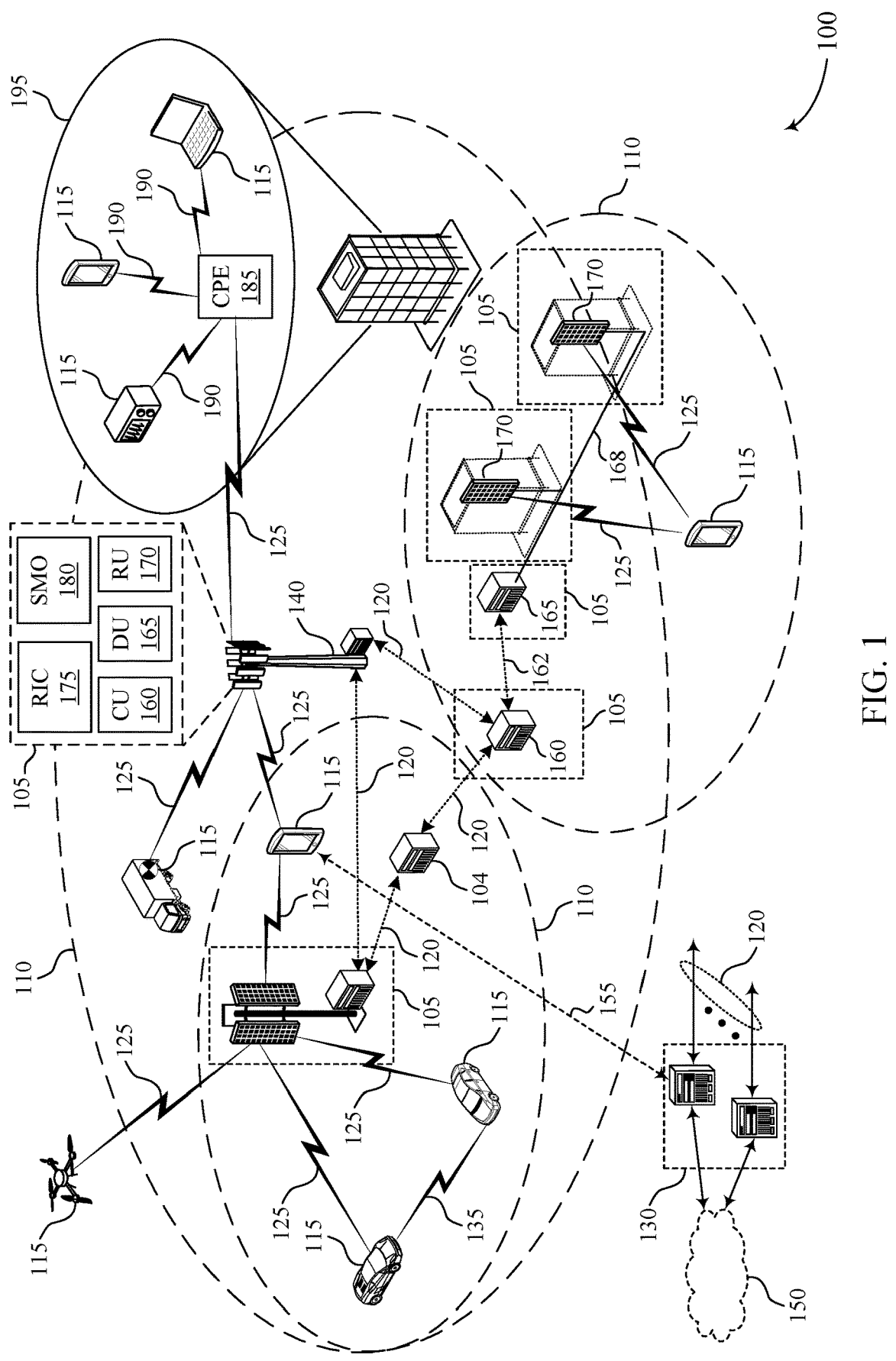
FIG. 1 illustrates an example of a wireless communications system that supports broadcast traffic scheduling across multiple radio access technologies (RATs) in accordance with one or more aspects of the present disclosure.

In some wireless communications systems, fixed wireless access (FWA) deployments may be used in which a wireless device of a wireless local area network (e.g., a Wi-Fi Access Point (AP)) may carry a last segment of traffic between a wide area network (e.g., a fifth generation (5G) or sixth generation (6G) wireless communications system) and one or more endpoint devices (e.g., a user equipment (UE) or end user device). In some cases, the wide area network (WAN) may transmit multicast and broadcast services (MBS) traffic to multiple users, some of which may receive the MBS traffic via a wireless local area network (WLAN) that receives the traffic from the WAN and provides it to associated users. For example, a Wi-Fi AP may be communicate with a 5G modem (e.g., in a customer premises equipment (CPE) that includes both a 5G modem and a WLAN AP), where the 5G modem receives MBS traffic via a 5G network (e.g., a first radio access network (RAN) that uses a first RAT, and the AP uses a Wi-Fi connection (e.g., a second RAN that uses a second RAT) to complete the link to multiple users. In some cases, the 5G modem may have relatively good channel conditions and radio connectivity to the 5G network, and the network may operate based on such conditions (e.g., data rates are based on relatively good channel conditions between the 5G modem and a 5G serving cell).

However, in some cases the WLAN may be serving multiple different streams that may result in a bottleneck for the MBS traffic, which may result in delays in the MBS traffic and a poor user experience in cases where the MBS traffic is delay sensitive. Such a bottleneck may occur, for example, due to a scheduler at the WLAN (e.g., a scheduler of the Wi-Fi AP) being unaware that the MBS traffic is delay sensitive and serving other traffic that is more delay tolerant (e.g., enhanced mobile broadband (eMBB) traffic, or other background (BK) or best-efforts (BE) traffic) ahead of the MBS traffic. In cases where MBS traffic experiences such delays, it may result in quality of service (QoS) targets not being met for the MBS traffic, even though the 5G network has information that indicates the relatively good channel conditions at the 5G modem. Thus, enhanced techniques to allow for a LAN using a second RAN (e.g., a Wi-Fi network) to provide appropriate prioritization for MBS traffic of a first RAN (e.g., a 5G network) for a 'last mile' of connectivity between the first RAN and a UE may help to enhance user experience, maintain MBS QoS targets, and enhance reliability and network efficiency.

In accordance with various aspects discussed herein, a WAN modem (e.g., a 5G modem that provides connectivity with a 5G network) may provide MBS information to a WLAN scheduler (e.g., a Wi-Fi scheduler of a Wi-Fi AP) related to MBS traffic that is carried via both the WAN and WLAN to one or more end users. The information related to the MBS traffic may be passed from the WAN modem to the WLAN scheduler along with MBS data, or separately from the MBS data. In some aspects, the MBS traffic may be broadcast communications, and a device that receives the broadcast communications, such as a customer premises equipment (CPE), via the first RAT may decode broadcast data from the broadcast communications and provide the broadcast data to the WLAN scheduler along with one or more parameters associated with the broadcast data.

The WLAN scheduler may establish a separate background AC (AC) queue for the broadcast data, and may transmit data from the broadcast AC queue based on one or more threshold values. In some cases, if an amount of data in the broadcast AC queue exceeds a first threshold, the WLAN scheduler may discontinue broadcast transmissions to UEs that did not solicit the broadcast service, and transmit only to UEs that did solicit the service. Further, if the amount of data in the broadcast AC queue exceeds a second threshold (e.g., that is greater than the first threshold), the WLAN scheduler may discontinue all broadcast transmissions, and provide a notice to a WAN modem. In some cases, the WAN modem may transmit the broadcast data to the UEs, or another network entity in the WAN may transmit the broadcast data to the UEs. In some cases, the threshold values for the broadcast AC queue may be based on broadcast service parameters, such as a number of solicited clients, quality of service (QoS) parameters (e.g., 5QI parameters and associated thresholds), or bandwidth of the traffic (e.g., whether the bandwidth is above or below a threshold value). The WLAN scheduler may receive the broadcast-related information and prioritize the broadcast traffic accordingly, which can enhance efficiency and provide MBS services with appropriate quality Aspects of the disclosure are initially described in the context of wireless communications systems. Aspects of the disclosure are further illustrated by and described with reference to process flows, AC queues, apparatus diagrams, system diagrams, and flowcharts that relate to broadcast traffic scheduling across multiple RATs.

FIG. 1 illustrates an example of a wireless communications system 100 that supports broadcast traffic scheduling across multiple radio access technologies in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs

115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, an endpoint device, a CPE, a computing system, one or more components, or another suitable processing entity configured to perform any of the techniques described herein. For example, a node may be a UE 115. As another example, a node may be a network entity 105 or a CPE 185. As another example, a first node may be configured to communicate with a second node or a third node. In one aspect of this example, the first node may be a UE 115, the second node may be a network entity 105 or CPE 185, and the third node may be a UE 115. In another aspect of this example, the first node may be a UE 115, the second node may be a network entity 105 or CPE 185, and the third node may be a network entity 105 or CPE 185. In yet other aspects of this example, the first, second, and third nodes may be different relative to these examples. Similarly, reference to a UE 115, network entity 105, CPE 185, apparatus, device, computing system, or the like may include disclosure of the UE 115, network entity 105, CPE 185, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support broadcast traffic scheduling across multiple RATs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, and endpoint device, or a subscriber device, or some other suitable terminology, where the "device" may also be referred to as a unit, a station, a terminal, or a client, among other examples. A UE 115 may also act as a CPE in some cases. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol).

In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, communication links 125 may use a first RAT (e.g., a 5G or a 6G RAT) and a connection for some UEs 115 may be provided using multiple RATs. For example, some UEs 115 located in proximity to a CPE 185 may be served using links 190 of a second RAT (e.g., via a Wi-Fi WLAN in Wi-Fi coverage area 195 served by CPE 185), where the CPE 185 communicates with a network entity 105 via using the first RAT via a communication link 125. In accordance with various aspects discussed herein, a scheduler associated with the second RAT may prioritize some communications received via the first RAT based on one or more parameters associated with the communications of the first RAT. For example, MBS communications of the first RAT may be prioritized by the scheduler associated with the second RAT based on MBS information with one or more parameters provided with the MBS communications, where the one or more parameters are associated with the communications of the first RAT. Several examples of communications over multiple RATs are discussed with reference to FIGS. 2 through 6.

Figure 2:
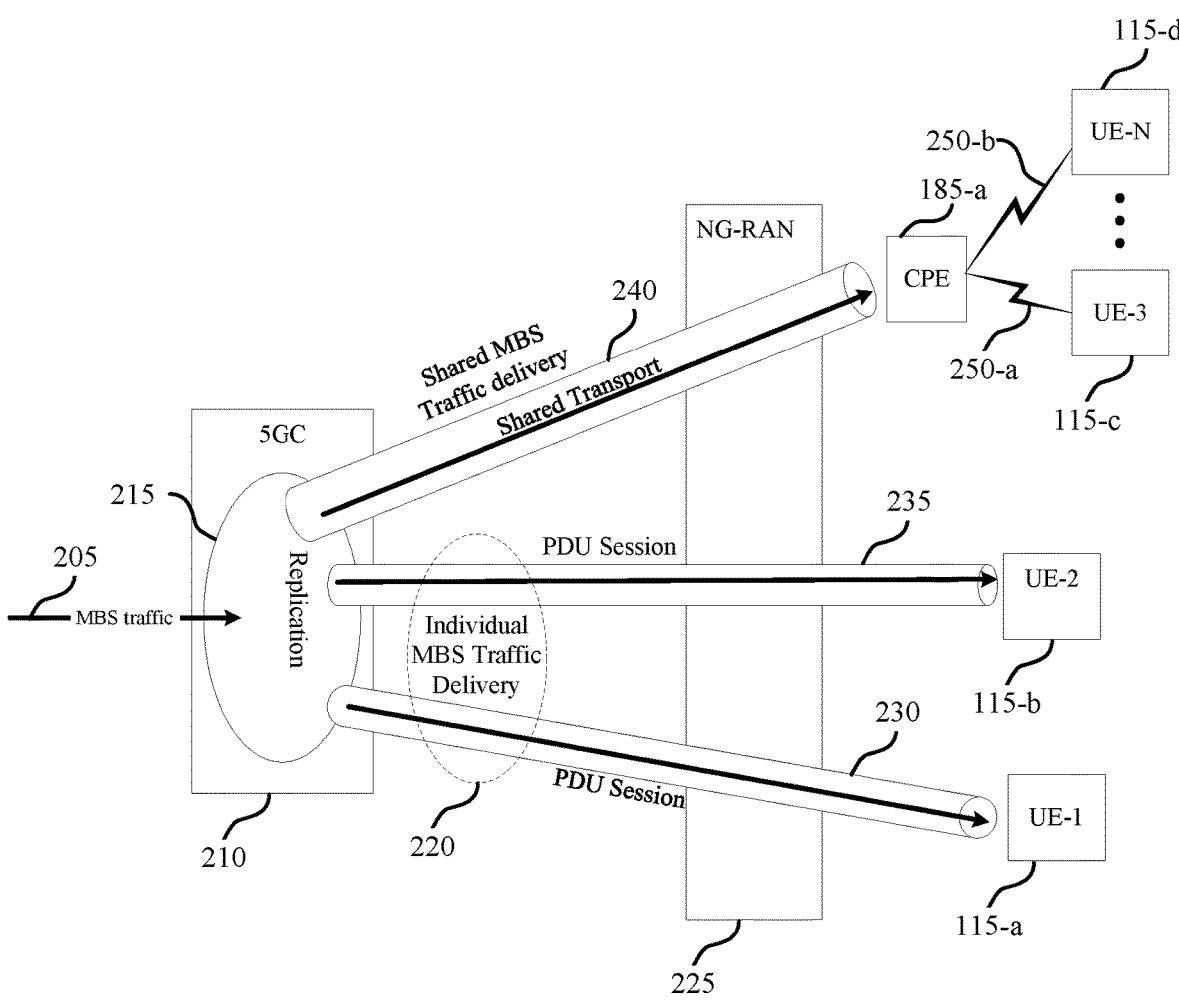
FIG. 2 illustrates an example of multicast and broadcast service (MBS) traffic delivery via a wireless communications system in accordance with one or more aspects of the present disclosure.

FIG. 2 illustrates an example of MBS traffic delivery via a wireless communications system 200 that supports broadcast traffic scheduling across multiple RATs in accordance with one or more aspects of the present disclosure. The wireless communications system 200 includes a first UE 115-a, a second UE 115-b, a third UE 115-c, and a fourth UE 115-d, which may be examples of UEs 115 described with reference to FIG. 1. The wireless communications system 200 in this example includes a core network 210 (e.g., 5GC, or a core network 130 described with reference to FIG. 1) and a first RAN 225 (e.g., NG-RAN) that includes one or more network entities (e.g., network entities 105 described with reference to FIG. 1) that provide the radio air interface between the first RAN 225 and UEs 115 or a CPE 185-a using a first RAT. Further, the CPE 185-a may provide wireless communications using a second RAT (e.g., Wi-Fi) to one or more UEs 115.

In the example of FIG. 2, MBS traffic 205 may be received at the core network 210 and transmitted to multiple UEs 115. The MBS traffic 205 may provide data for one or more of multiple use cases, such as live streaming of events using a multicast subscription-based model, broadcast services, delay sensitive signaling, or high resolution Internet protocol television (IPTV), to provide a few examples. In some cases, a replication function 215 at the core network 210 may replicate the MBS traffic 205 for the multiple UEs for transmission via individual MBS traffic delivery 220 for individual UEs 115 (e.g., a point-to-point (PTP) MBS flow), or for transmission via shared MBS traffic delivery 240 to two or more UEs 115 (e.g., a point-to-multipoint (PTM) MBS flow). In this example, a first PDU session 230 for individual MBS traffic delivery 220 may be established for the first UE 115-a, and a second PDU session 235 for individual MBS traffic delivery 220 may be established for the second UE 115-b. Further, a shared transport for shared MBS traffic delivery 240 to both the third UE 115-c and fourth UE 115-d. In this example, the shared MBS traffic delivery 240 may be transported via the first RAN 225 to CPE 185-a, and the CPE 185-a may provide the MBS traffic 205 to the third UE 115-c, the fourth UE 115-d, one or more other UEs, or any combinations thereof. For example the CPE 185-a may use a first Wi-Fi link 250-a (e.g., a link 190 described with reference to FIG. 1) for communications with the third UE 115-c and may use a second Wi-Fi link 250-b (e.g., a link 190 described with reference to FIG. 1) for communications with the fourth UE 115-d. In some cases, the first RAN 225 that is capable of MBS may determine dynamically whether to do a PTP or PTM for UEs 115 that are to receive the MBS traffic 205, based on several factors such as proximity to a same transmission-reception point (TRP) of the first RAN 225, characteristics of MBS traffic 205 to be transmitted (e.g., an initial transmission or retransmission, delay tolerance of the data, etc.), channel conditions observed at the UEs 115, and the like.

In some cases, the CPE 185-a may provide a 'list mile' of connectivity between the core network 210 and the third UE 115-c and the fourth UE 115-d, which may help enhance efficiency and reliability of communications between the core network 210 and the third UE 115-c and fourth UE 115-d. For example, the third UE 115-c and the fourth UE 115-d may be located in a structure that prevents a reliable connection with the first RAN 225 using the first RAT, but may have a reliable connected with the CPE 185-a using the second RAT. The CPE 185-a, in turn, may be located at or in the structure at a location that provides a reliable connection with the first RAN 225 using the first RAT, and thus using both the first RAT and the second RAT may provide effective and reliable end-to-end connections for the third UE 115-c and the fourth UE 115-d. In some cases, providing a last portion of a wireless connection using the CPE 185-a may be referred to a fixed wireless access (FWA). The CPE 185-a may include, for example, a mobile router, a soft-AP CPE, a gateway CPE, or an outdoor unit (ODU) that may have an associated indoor AP, for example.

In some cases, MBS traffic 205 may be received (via the first RAN 225) at the CPE 185-a, where the CPE 185-a has a WAN interface (e.g., a 5G RAN interface) and an Ethernet or Wi-Fi interface (or both) for LAN clients such as the third UE 115-c and the fourth UE 115.d. However, existing LAN systems, upon receipt of the MBS traffic 205, may place the associated data in a buffer for transmission via the second RAT and the WAN may consider the associated data as being successfully received. As discussed herein, in the event that the MBS traffic 205 is placed in a traditional buffer for transmission, other traffic at the CPE may result in the MBS traffic 205 being delayed. Such a delay may result in QoS targets for the MBS traffic 205 not being met. Further, in some cases a relatively large number of UEs 115 may be served via the CPE 185-a, with multiple instances of the MBS traffic 205 being placed in the buffer for transmission to the UEs 115. In some cases, the second RAT may provide a multicast and broadcast mode, but such modes may provide relatively low data rates (e.g., due to such transmissions being set to a lowest possible decodable rate in order to be received by devices that may only support low rates).

In some cases, to provide higher effective data transfer rates the MBS traffic 205 may be converted to unicast data for each served client, which may be transmitted at substantially higher rates than available in the multicast and broadcast mode such that, even in cases where a large number of clients are to receive the MBS traffic 205, efficiency is enhanced through transmission of unicast data. Further, since the frames are transmitted as unicast, the transmission rates can be further enhanced based on the client receiving capability, and thus such techniques can provide more efficient airtime usage. As discussed above however, in cases where the MBS traffic 205 is placed in a transmit queue for each served client, latency due to other traffic may result in QoS targets of the MBS traffic 205 not being met, even when converted to unicast data for transmission to served clients. In some cases, the first RAN 225 may support QoS control per MBS session, where one or multiple QoS flows may be either a guaranteed bit rate (GBR) or non-GBR flow, for an MBS session. QoS flows may have associated QoS parameters (e.g., 5G QoS identifier (5QI) parameters), that are based on data that is transmitted via the flow.

In accordance with various aspects discussed herein, the CPE 185-a may provide information to enable MBS traffic

205 awareness at a WLAN scheduler. Such MBS traffic 205 awareness may help to improve user-experience and also may enhance overall network efficiency. In some cases, the WLAN scheduler may use the awareness of the MBS traffic to prioritize the MBS traffic with other WLAN traffic based on parameters of the MBS traffic 205. In some cases, the WLAN scheduler may establish a separate background AC queue for the broadcast data, and may transmit data from the broadcast AC queue based on one or more threshold values. An example of a AC queues that include a separate background AC queue in accordance with various aspects of the disclosure is discussed with reference to FIG. 3.

Figure 3:
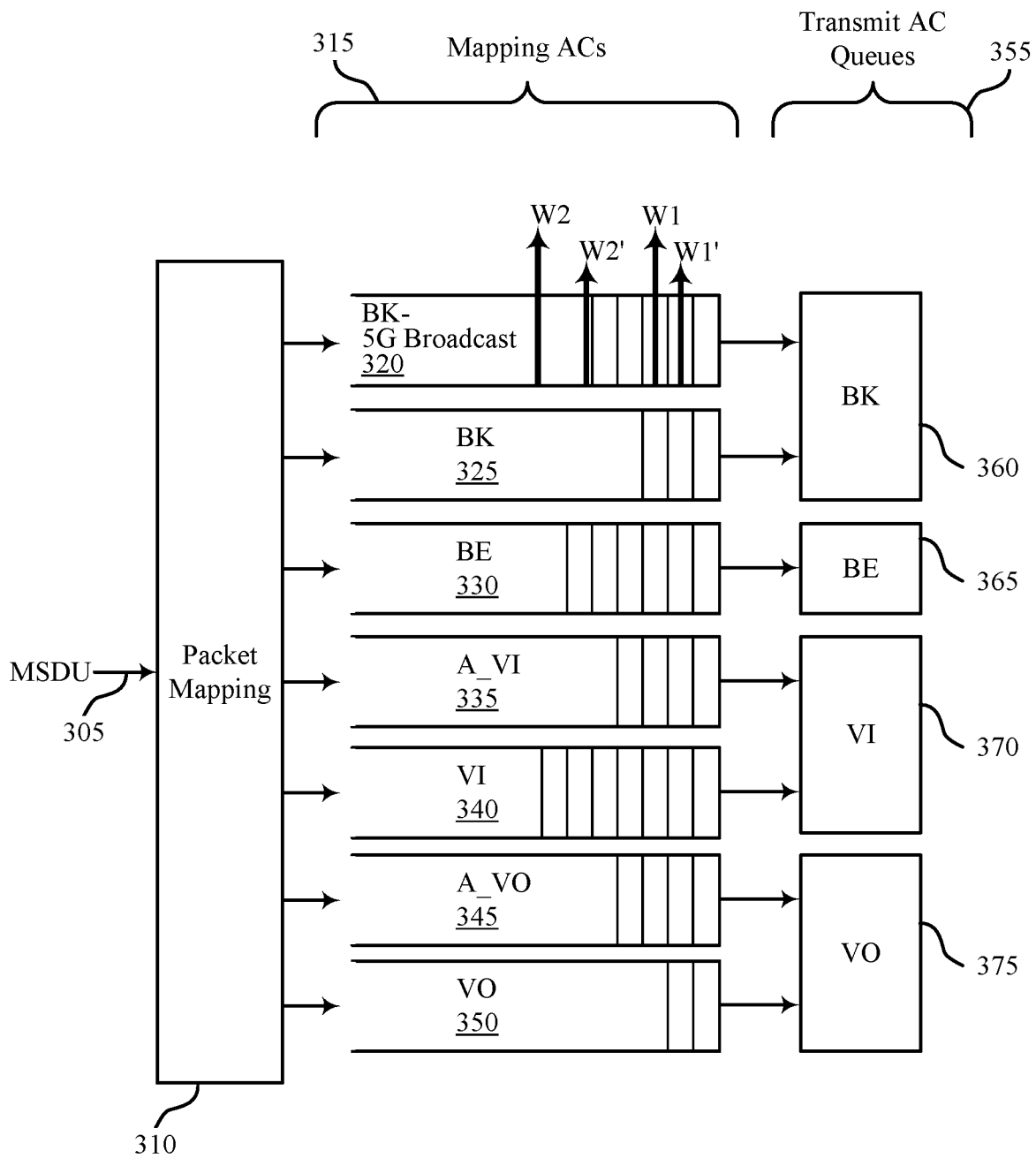
FIG. 3 illustrates an example of access category queues that support broadcast traffic scheduling across multiple RATs in accordance with one or more aspects of the present disclosure.

FIG. 3 illustrates an example of AC queues 300 that support broadcast traffic scheduling across multiple radio access technologies in accordance with one or more aspects of the present disclosure. The AC queues 300 may be implemented in a system that supports broadcast traffic scheduling across multiple RATs, such as in a wireless communications system as described with reference to FIGS. 1 and 2.

In the example, of FIG. 3, a WLAN scheduler, such as a WLAN scheduler of a FWA CPE, may provide a broadcast flow as discussed herein (e.g., based on one or more parameters associated with the flow). The WLAN scheduler may receive a MAC service data unit (MSDU) 305, which may be provided to a packet mapping function 310. The packet mapping function 310 may map packets of the MSDU into one of multiple ACs 315, which include a background-5G (BK-5G) broadcast AC 320, a regular background (BK) AC 325, a best efforts (BE) AC 330, an alternate video (A_VI) AC 335, a video (VI) AC 340, an alternate voice (A_VO) AC 345, and a voice (VO) AC 350. The mapped ACs may then be mapped to one of multiple transmit AC queues 355, in which the BK-5G broadcast AC 320 and the BK AC 325 are mapped to BK transit queue 360, the BE AC 330 is mapped to BE transmit queue 365, the A_VI AC 335 and VI AC 340 are mapped to VI transmit queue 370, and the A_VO AC 345 and the VO AC 350 are mapped to the VO transmit queue 375.

In some cases, a WLAN scheduler may map broadcast data from the MSDU 305 to the BK-5G broadcast AC 320 based on one or more parameters associated with the MSDU 305, which may include one or more of a number of clients (e.g., UEs or other end user or endpoint devices), whether clients solicited the MBS broadcast traffic, QoS associated with the MBS broadcast traffic, a bandwidth of the MBS broadcast traffic, or any combinations thereof. In some cases, the WLAN scheduler may treat MBS broadcast traffic differently based on an amount of data associated with the BK-5G broadcast AC 320 relative to one or more threshold values. In the example of FIG. 3, a first threshold value W1 may be associated with an amount of data that may start to impact one or more other flows of the WLAN, and a first level of broadcast client throttling may be implemented, such as throttling clients that did not solicit the broadcast MBS traffic. A second threshold value W2 may be associated with an amount of data that may significantly impact one or more other flows of the WLAN, and a second level of broadcast client throttling may be implemented, such as throttling all of the broadcast MBS traffic. In some cases, if an amount of data associated with the BK-5G broadcast AC 320 drops below a third threshold value (W2'), the WLAN scheduler may resume broadcast transmissions for solicited clients, and if the amount of data associated with the BK-5G broadcast AC 320 drops below a fourth threshold value (W1') that is less than the first threshold (W1), the WLAN scheduler may resume broadcast transmissions for both solicited and unsolicited clients.

Such techniques for the separate BK-5G broadcast AC 320 may help to maintain overall system performance by throttling broadcast traffic in different stages based on queue status. Further, in some cases, the various thresholds may be adjusted based on other traffic served by the WLAN scheduler. Transmissions from the BK-5G broadcast AC 320 would be transmit only, and would not require an ACK confirmation at the WLAN MAC level for a successful reception at the client, and the described techniques may allow the WLAN scheduler to provide enhanced user-experience and network efficiency.

Figure 4:
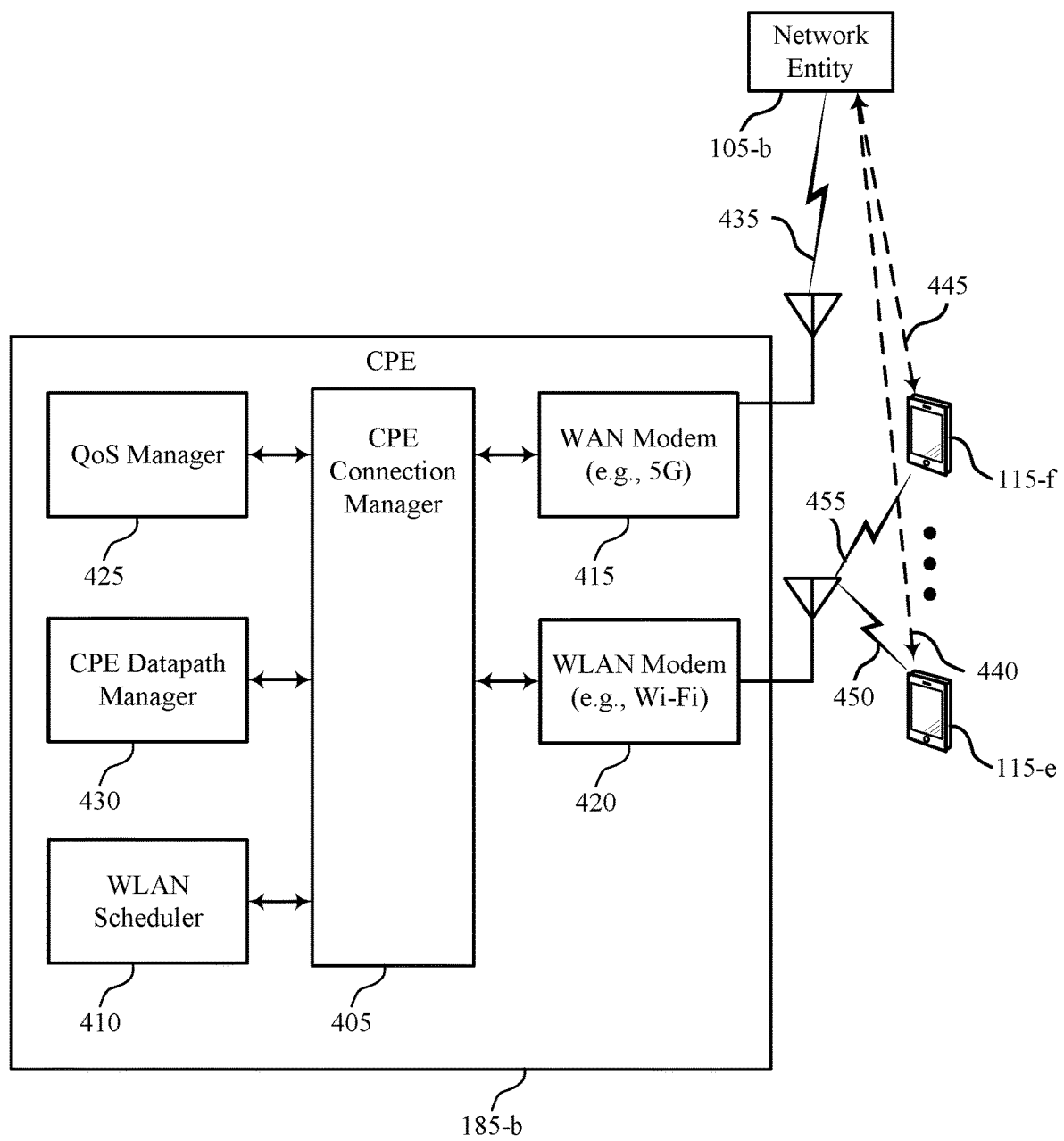
FIG. 4 illustrates an example of a wireless communications system with customer premises equipment (CPE) that supports broadcast traffic scheduling across multiple RATs in accordance with one or more aspects of the present disclosure.

FIG. 4 illustrates an example of a wireless communications system 400 with customer premises equipment (CPE) that supports broadcast traffic scheduling across multiple radio access technologies in accordance with one or more aspects of the present disclosure. The wireless communications system 400 includes a first UE 115-*e* through an n-th UE 115-*f*, which may be examples of UEs 115 described with reference to FIGS. 1 through 3. The wireless communications system 400 in this example includes a network entity 105-*b* and a CPE 185-*b*, which may be examples of network entities 105 and CPEs 185 described with reference to FIGS. 1 through 3. In this example, network entity 105-*b* may communicate with the CPE 185-*b* via a first link 435 using a first RAT (e.g., 5G), and the CPE 185-*b* may communicate with UEs 115-*e* through 115-*f* via second link 450 through n-th link 455 using a second RAT (e.g., Wi-Fi a WLAN). In some cases, the network entity 105-*b* may communicate directly with one or more of the UEs 115 via associated links 440 through 445.

The CPE 185-*b* may include, in the example of FIG. 4, a CPE connection manager 405, a WLAN scheduler 410, a WAN modem 415 (e.g., a 5G or 6G modem that communicates in a first RAN according to a first RAT), a WLAN modem 420 (e.g., a Wi-Fi AP that communicates in a second RAN according to a second RAT), a QoS manager 425, and a CPE datapath manager 430. The CPE 185-*b* may include associated hardware and software to perform various techniques as discussed herein, such as modems and associated chipsets for communications (e.g., via multiple RANs, LANs, WANs, or combinations thereof), antennas for communications using different RATs, wireline ports for access to WANs/LANs (e.g., Ethernet, digital subscriber line (DSL), gigabit Ethernet passive optical network (GPON), etc.), one or more processors or controllers that provide various managers, and one or more memories that may buffer data and store instructions that may be executed perform one or more of the functions described herein.

As discussed herein, in some cases the CPE 185-*b* may receive MBS traffic, such as broadcast data, from the first RAN, and transmit the MBS traffic to two or more served UEs 115-*e* through 115-*f* via the second RAN, such that a single packet of broadcast data is transmitted in a one-to-many manner. In some cases, the CPE connection manager 405 may manage connections of the different networks, the WLAN scheduler 410, the QoS manager 425, and the CPE datapath manager 430. The QoS manager 425 may monitor and configure various QoS parameters for different data flows, including MBS data flows that are provided via the CPE 185-*b*. The CPE datapath manager 430 route various flows via different data paths based on information from the WLAN scheduler 410, one or more configured rules (e.g., QoS rules), or any combinations thereof. The WLAN scheduler 410, in conjunction with the datapath manager 430, may thus perform traffic steering, traffic switching, and the like, between different data paths for LAN or WAN communications.

In some cases, the WLAN scheduler 410 may schedule MBS broadcast transmissions for one or more of the UEs 115 for a broadcast session on the WAN using FWA WLAN communications, and may prioritize data traffic associated with the broadcast session based on one or more parameters associated with the broadcast MBS transmissions. In some cases, the WLAN scheduler 410 may use the one or more parameters to manage a relatively large number of WLAN clients (e.g., UEs 115-*e* through 115-*f*) participating in the broadcast session, which may result in a relatively large amount of air-time spent in transmitting broadcast traffic, and may in some cases result in backpressure due to the one-to-many relationship between a broadcast packet received via WAN modem 415 and associated multiple broadcast packets transmitted via WLAN modem 420. In some cases, the CPE 185-*b* may have a shared buffer between the WLAN modem 420 and the WAN modem 415, and the broadcast traffic awareness may allow for appropriate allocation of the shared buffer. The one or more parameters associated with the broadcast traffic may also indicate a relatively high bandwidth versus relatively low bandwidth broadcast, which may allow for appropriate allocation of resources for different traffic flows (e.g., the broadcast data flow and one or more other LAN or WAN flows). Further, the one or more parameters associated with the broadcast traffic may indicate whether the broadcast traffic has a relatively high QoS or is delay critical, which may allow for WLAN scheduling that provides differentiated service (e.g., even within a same AC).

In accordance with various aspects, the WLAN scheduler 410 may use one or more parameters associated with a broadcast flow to perform efficient WLAN scheduling. In some cases, the WLAN scheduler 410 may establish a separate BK-5G broadcast AC queue for the broadcast data, and may transmit data from the BK-5G broadcast AC queue based on one or more threshold values, such as discussed with reference to FIG. 3. In some cases, the different threshold values may be used to determine scheduling for the broadcast data, and the threshold values may be set, or adjusted, based on various factors, such as a number of UEs 115 that have solicited broadcast communications versus a number of unsolicited UEs 115, one or more QoS parameters (e.g., 5QI of the broadcast flow), a bandwidth of the broadcast flow, or any combinations thereof. In some cases, MBS broadcast may considered as a low priority QoS, which may be mapped to a BK AC, and the separate AC queue as discussed herein may be used with the different threshold values to differentiate the MBS broadcast traffic from other flows at the WLAN scheduler 410, with threshold values set to maintain overall system performance.

Figure 5:
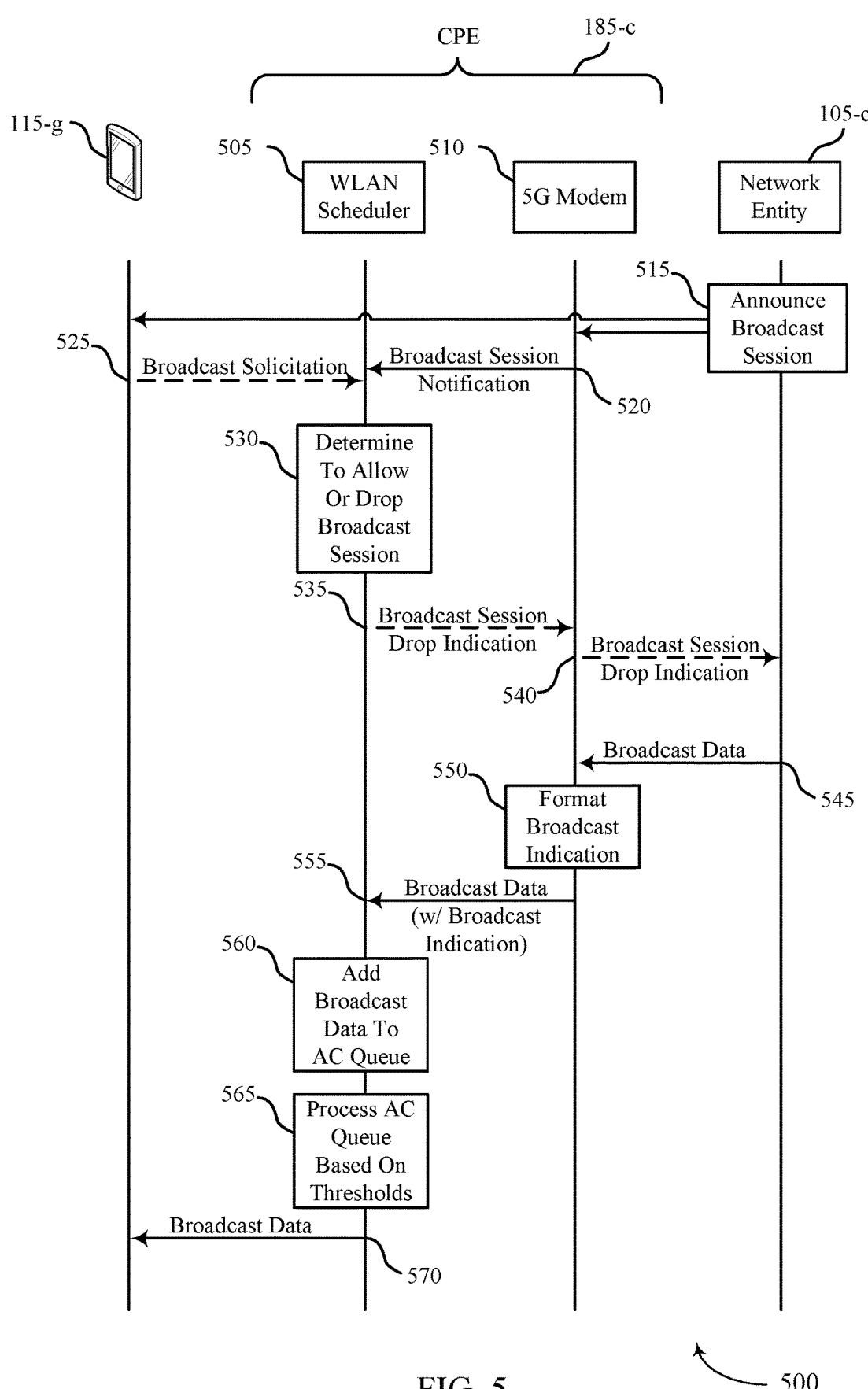
FIG. 5 illustrates an example of a process flow that supports broadcast traffic scheduling across multiple RATs in accordance with one or more aspects of the present disclosure.

FIG. 5 illustrates an example of a process flow 500 that supports broadcast traffic scheduling across multiple radio access technologies in accordance with one or more aspects of the present disclosure. Process flow 500 includes a UE 115-*g*, which may be an example of UEs 115 described with reference to FIGS. 1 through 4. Process flow 500 also includes a network entity 105-*c*, and a CPE 185-*c* that includes a WLAN scheduler 505, and a 5G modem 510, which may be examples of corresponding devices described with reference to FIGS. 1 through 4. The process flow 500 may implement aspects of wireless communications system 100, 200, or 400. For example, the process flow 500 may support broadcast traffic scheduling across multiple RATs.

In the following description of the process flow 500, the signaling exchanged between the UE 115-*g*, WLAN scheduler 505, 5G modem 510, and the network entity 105-*c*, may be exchanged in a different order than the example order shown, or the operations performed by the UE 115-*g*, WLAN scheduler 505, 5G modem 510, and the network entity 105-*c*, may be performed in different orders or at different times. Some operations may also be omitted from the process flow 500, and other operations may be added to the process flow 500. Further, the WLAN scheduler 505 and 5G modem 510 are shown for purposes of illustration and discussion only, and techniques as discussed herein may be applied to other RANs/RATs.

At 515, the network entity 105-*c* may announce a broadcast session. In some cases, the broadcast session may provide one or more broadcast services, such as a video stream available to all UEs 115 in a system. In some cases, the announcement of the broadcast session may provide one or more parameters associated with the session, such as an expected bandwidth or data rate, a QoS for the broadcast flow, or any combinations thereof. The announcement of the broadcast session may be provided, for example, in MBS configuration information provided in a medium access control (MAC) control element (CE), or in other control information or system information. In some cases, the broadcast session announcement may be received directly by the UE 115-*g* via the 5G RAN, or may be received according to a FWA configuration via CPE 185-*c* and a WLAN associated with WLAN scheduler 505.

At 520, the 5G modem 510 may provide a broadcast session notification to the WLAN scheduler 505. In some cases, the broadcast session notification may provide information related to the broadcast session, such as 5QI information, bandwidth of the broadcast, or any combinations thereof. At 525, optionally, the UE 115-*g* may transmit a broadcast solicitation to the WLAN scheduler 505. In some cases, the UE 115-*g* may be configured for FWA via the WLAN associated with CPE 185-*c*, and may transmit the broadcast solicitation based on the broadcast session announcement. In some cases, one or more other UEs configured for FWA via the WLAN associated with CPE 185-*c* may not provide a broadcast solicitation, and may be referred to as unsolicited UEs or unsolicited clients.

At 530, the WLAN scheduler 505 may determine to allow or drop the broadcast session. In some cases, the determination may be based on one or more parameters of the broadcast session, an amount of data in an AC associated with broadcast traffic (e.g., a BK-5G broadcast AC queue), one or more thresholds associated with the AC for broadcast traffic, a number of solicited clients, a number of unsolicited clients, a capability of the clients served by the CPE 185-*c*, a number of non-MBS flows served by the CPE 185-*c*, or any combinations thereof. At 535, based on a determination to drop the broadcast flow, the WLAN scheduler 505 may transmit a broadcast session drop indication request to the 5G modem 510. At 540, in cases where the WLAN scheduler 505 transmits the drop indication, the 5G modem 510 may transmit the broadcast session drop indication request to the network entity 105-*c*. At 545, the network entity 105-*c* may transmit broadcast data to the 5G modem 510.

At 550, the 5G modem may format a broadcast indication associated with the broadcast flow. In some cases, the broadcast indication may provide one or more parameters associated with the broadcast flow, or may indicate an ID of a broadcast session associated with a prior broadcast session notification. In some cases, the broadcast indication may be provided to the WLAN scheduler 505 with broadcast data, at 555, or may be provided separately from the broadcast data.

At 560, the WLAN scheduler 505 may add the broadcast data to an associated AC queue (e.g., a BK-5G broadcast AC queue), based on one or more threshold values associated with the associated AC queue. At 565, the WLAN scheduler 505 may process the broadcast AC queue based on the one or more threshold values. For example, broadcast data may be dropped from the broadcast AC queue for unsolicited clients if the broadcast AC queue size exceeds a first threshold value, and may drop broadcast data from the broadcast AC queue from both solicited and unsolicited clients if the broadcast AC queue size exceeds a second threshold value. In some cases, if the broadcast AC queue size drops below a third threshold value that is less than the second threshold value broadcast data for solicited clients may be restored to the broadcast AC queue, and if the broadcast AC queue size drops below a fourth threshold value that is less than the first threshold value broadcast data for solicited and unsolicited clients may be restored. At 570, the WLAN scheduler 505 may schedule the broadcast data for transmission by a WLAN modem (e.g., a Wi-Fi modem) to the UE 115-*g*, in accordance with the broadcast AC queue.

Figure 6:
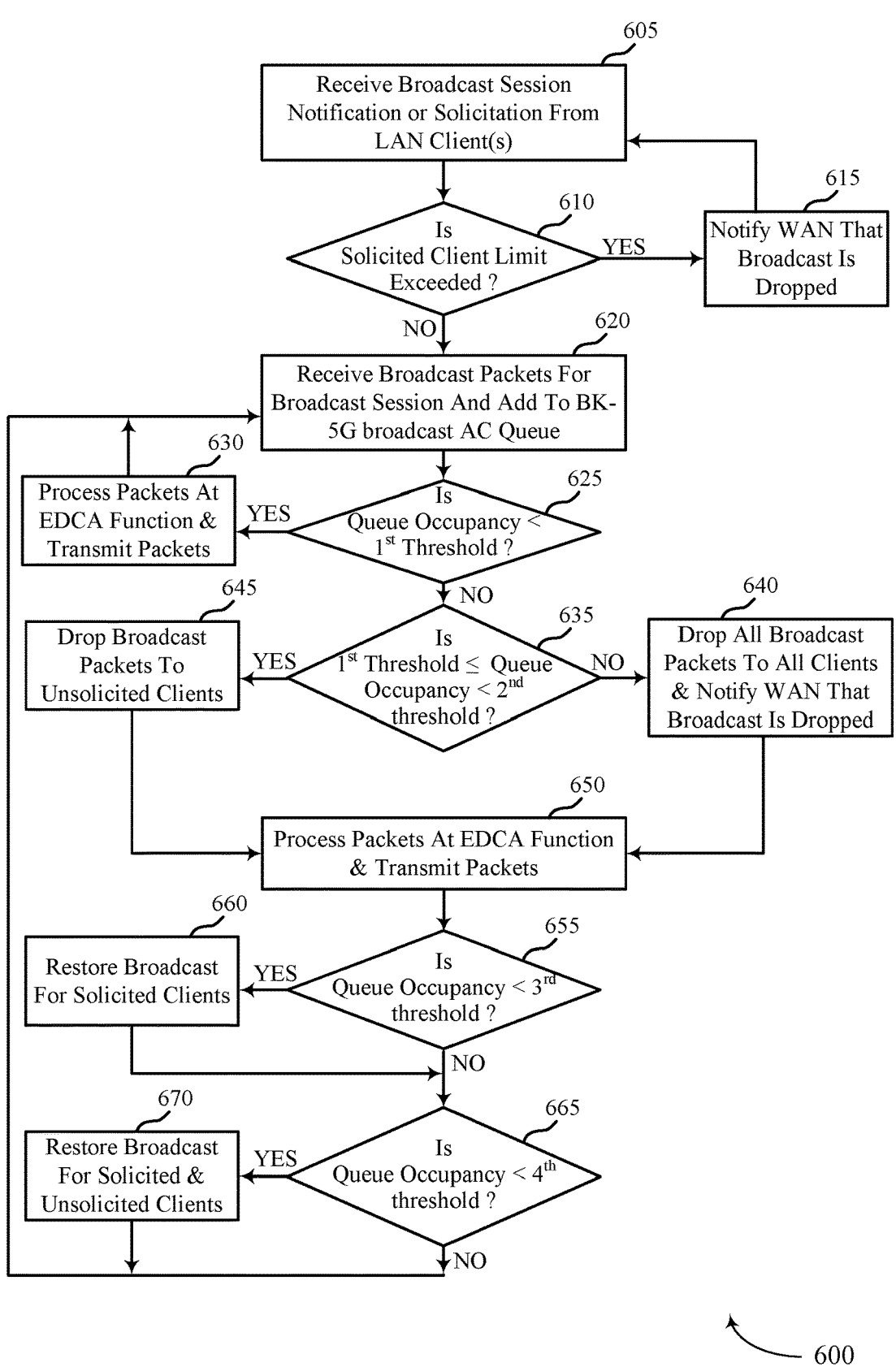
FIG. 6 illustrates an example of a flow chart that illustrates broadcast traffic scheduling across multiple RATs in accordance with one or more aspects of the present disclosure.

FIG. 6 illustrates an example of a flow chart 600 that illustrates broadcast traffic scheduling across multiple radio access technologies in accordance with one or more aspects of the present disclosure. The flow chart 600 may be implemented in a system that supports broadcast traffic scheduling across multiple RATs, such as described with reference to FIGS. 1 through 5. The operations as discussed with reference to flow chart 600 may be performed by one or more components of a CPE, such as a WLAN scheduler, as discussed herein.

At 605, the WLAN scheduler may receive a broadcast session notification from a WAN modem, or solicitation from one or more LAN clients for the broadcast session. In some cases, the solicitation(s) may be received from one or more UEs in a FWA configuration on which the CPE communicates with a first RAN using a first RAT, and the CPE communicates with the UEs in a second RAN using a second RAT.

At 610, the WLAN scheduler may determine if a solicited client limit is exceeded for MBS broadcast sessions. In some cases, the solicited client limit may be based on a FWA CPE limit, or may be based on configuration information from the first RAN. In some cases, the solicited client limit may be set based on a capacity for broadcast communications via the CPE, a number of clients served via the CPE, or any combinations thereof. At 615, if it is determined at the solicited client limit is exceeded, the WLAN scheduler may notify the WAN (via the WAN modem) that broadcast transmissions via the CPE are dropped. In some cases, the WLAN scheduler may provide an indication to the UE that the MBS broadcast session is dropped, and the UE may attempt to receive the broadcast traffic directly via the first RAN.

At 620, if it is determined that the solicited client limit is not exceeded, the WLAN scheduler may receive broadcast packets for the broadcast session, and add the packets to an associated AC broadcast queue (e.g., a BK-5G broadcast AC queue). At 625, the WLAN scheduler may determine if the queue occupancy of the AC broadcast queue is less than a first threshold value. At 630, if it is determined that the queue occupancy is less than the first threshold, the WLAN scheduler may process packets at an enhanced distributed channel access (EDCA) function and schedule packets from the broadcast AC queue for transmission.

At 635, if it is determined that the queue occupancy is not less than the first threshold value, the WLAN scheduler may determine whether the queue occupancy is less than a second threshold value. The second threshold value may be greater than the first threshold value. At 640, if it is determined that the queue occupancy is greater than or equal to the second threshold value, the WLAN scheduler may drop all broadcast packets to all clients from the broadcast AC queue and notify the WAN that the broadcast transmissions via the CPE are dropped. At 645, if it is determined that the queue occupancy is greater than or equal to the first threshold and is less than the second threshold value, the WLAN scheduler may drop broadcast packets to unsolicited clients from the broadcast AC queue. At 650, the WLAN scheduler may process packets at the EDCA function and schedule packets (if any) from the broadcast AC queue for transmission.

At 655, the WLAN scheduler may determine if the broadcast AC queue occupancy is less than a third threshold value. The third threshold value may be less than the second threshold value, but greater than the first threshold value. At 660, if it is determined that the broadcast AC queue occupancy is less than the third threshold value, the WLAN scheduler may restore broadcast for solicited clients. At 665, the WLAN scheduler may determine if the broadcast AC queue occupancy is less than a fourth threshold value. The fourth threshold value may be less than the first threshold value. At 670, if it is determined that the broadcast AC queue occupancy is less than the fourth threshold value, the WLAN scheduler may restore broadcast for solicited and unsolicited clients, and continue with operations at 620.

Figure 7:
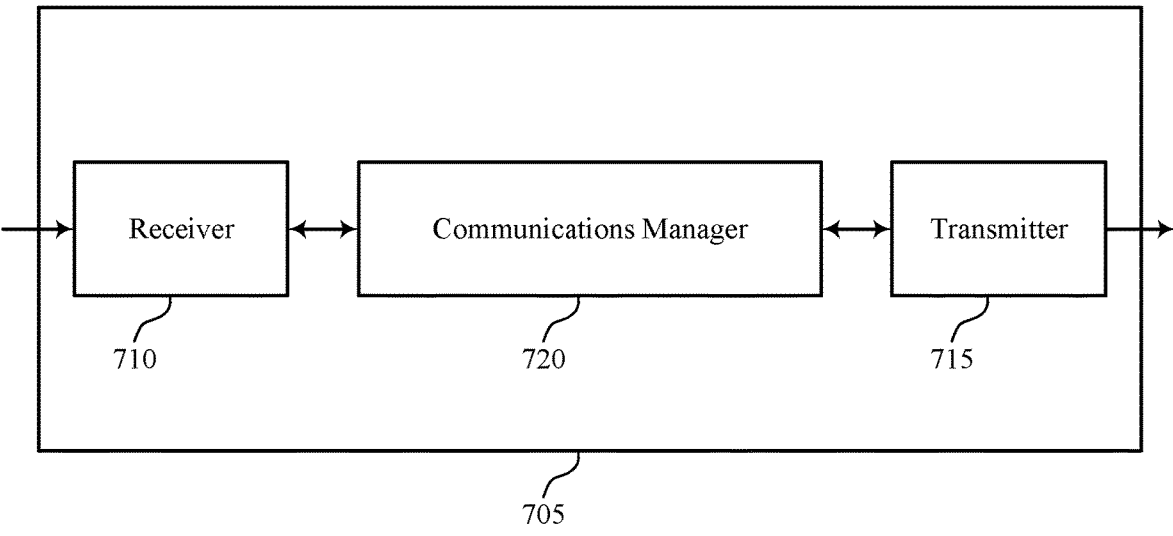
FIGS. 7 and 8 show block diagrams of devices that support broadcast traffic scheduling across multiple radio access technologies in accordance with one or more aspects of the present disclosure.

FIG. 7 shows a block diagram 700 of a device 705 that supports broadcast traffic scheduling across multiple radio access technologies in accordance with one or more aspects of the present disclosure. The device 705 may be an example of aspects of a UE 115, a CPE 185, or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to broadcast traffic scheduling across multiple radio access technologies). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to broadcast traffic scheduling across multiple radio access technologies). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of broadcast traffic scheduling across multiple radio access technologies as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. For example, the communications manager 720 may be configured as or otherwise support a means for receiving broadcast data associated with a broadcast service via a first wireless network using a first radio access technology, where the broadcast data is to be provided to a set of multiple clients via a second wireless network using a second radio access technology, and where the broadcast service has a set of broadcast service parameters. The communications manager 720 may be configured as or otherwise support a means for transmitting, to a scheduler of the second wireless network, a broadcast session notification message that indicates one or more broadcast service parameters of the set of broadcast service parameters. The communications manager 720 may be configured as or otherwise support a means for transmitting the broadcast data to the scheduler for transmission via the second wireless network, where a broadcast indication is transmitted with the broadcast data that indicates the broadcast data is associated with the broadcast service.

Additionally, or alternatively, the communications manager 720 may support wireless communication in accordance with examples as disclosed herein. For example, the communications manager 720 may be configured as or otherwise support a means for receiving, from a wireless modem, a broadcast session notification message that indicates a set of broadcast service parameters associated with a broadcast service that is provided via the wireless modem using a first wireless network that uses a first radio access technology. The communications manager 720 may be configured as or otherwise support a means for mapping, based at least in part on one or more broadcast service parameters of the set of broadcast service parameters, the broadcast service to a background broadcast AC queue of a second wireless network that uses a second radio access technology. The communications manager 720 may be configured as or otherwise support a means for receiving, from the wireless modem, broadcast data and a broadcast indication associated with the broadcast service, where the broadcast data is to be transmitted to a set of multiple clients via the second wireless network using the second radio access technology. The communications manager 720 may be configured as or otherwise support a means for buffering, based at least in part on the broadcast indication, the broadcast data in the background broadcast AC queue for transmission to the set of multiple clients via the second wireless network.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for prioritization of broadcast communications in traffic scheduling across multiple RATs that provide enhanced reliability for broadcast flows that are transmitted across multiple RAT to a UE, enhance network efficiency, and provide an enhanced user experience.

Figure 8:
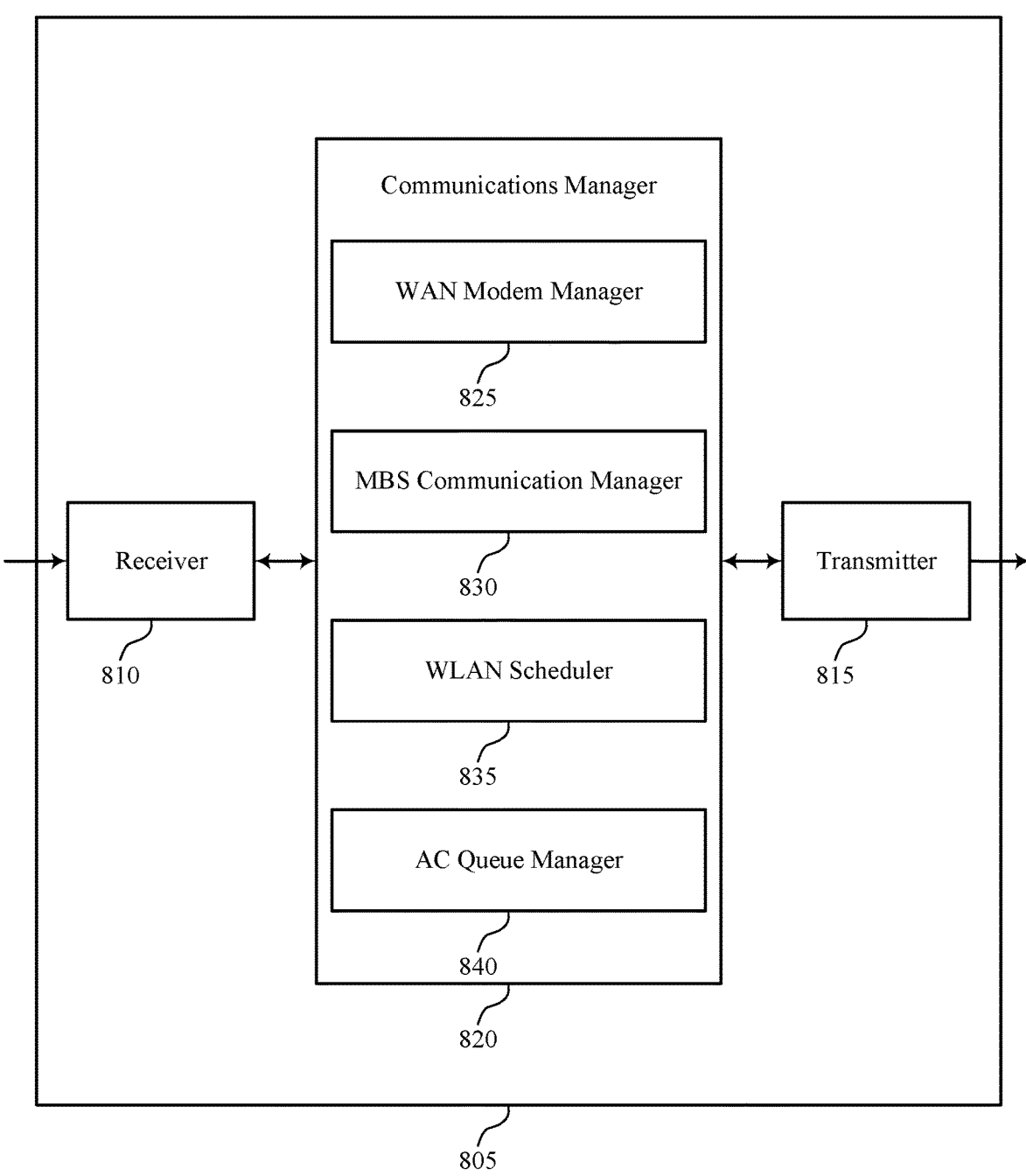

FIG. 8 shows a block diagram 800 of a device 805 that supports broadcast traffic scheduling across multiple radio access technologies in accordance with one or more aspects of the present disclosure. The device 805 may be an example of aspects of a device 705, a UE 115, a CPE 185, or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to broadcast traffic scheduling across multiple radio access technologies). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to broadcast traffic scheduling across multiple radio access technologies). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of broadcast traffic scheduling across multiple radio access technologies as described herein. For example, the communications manager 820 may include a WAN modem manager 825, an MBS communication manager 830, a WLAN scheduler 835, an AC queue manager 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. The WAN modem manager 825 may be configured as or otherwise support a means for receiving broadcast data associated with a broadcast service via a first wireless network using a first radio access technology, where the broadcast data is to be provided to a set of multiple clients via a second wireless network using a second radio access technology, and where the broadcast service has a set of broadcast service parameters. The MBS communication manager 830 may be configured as or otherwise support a means for transmitting, to a scheduler of the second wireless network, a broadcast session notification message that indicates one or more broadcast service parameters of the set of broadcast service parameters. The MBS communication manager 830 may be configured as or otherwise support a means for transmitting the broadcast data to the scheduler for transmission via the second wireless network, where a broadcast indication is transmitted with the broadcast data that indicates the broadcast data is associated with the broadcast service.

Additionally, or alternatively, the communications manager 820 may support wireless communication in accordance with examples as disclosed herein. The WLAN scheduler 835 may be configured as or otherwise support a means for receiving, from a wireless modem, a broadcast session notification message that indicates a set of broadcast service parameters associated with a broadcast service that is provided via the wireless modem using a first wireless network that uses a first radio access technology. The AC queue manager 840 may be configured as or otherwise support a means for mapping, based on one or more broadcast service parameters of the set of broadcast service parameters, the broadcast service to a background broadcast AC queue of a second wireless network that uses a second radio access technology. The WAN modem manager 825 may be configured as or otherwise support a means for receiving, from the wireless modem, broadcast data and a broadcast indication associated with the broadcast service, where the broadcast data is to be transmitted to a set of multiple clients via the second wireless network using the second radio access technology. The AC queue manager 840 may be configured as or otherwise support a means for buffering, based on the broadcast indication, the broadcast data in the background broadcast AC queue for transmission to the set of multiple clients via the second wireless network.

Figure 9:
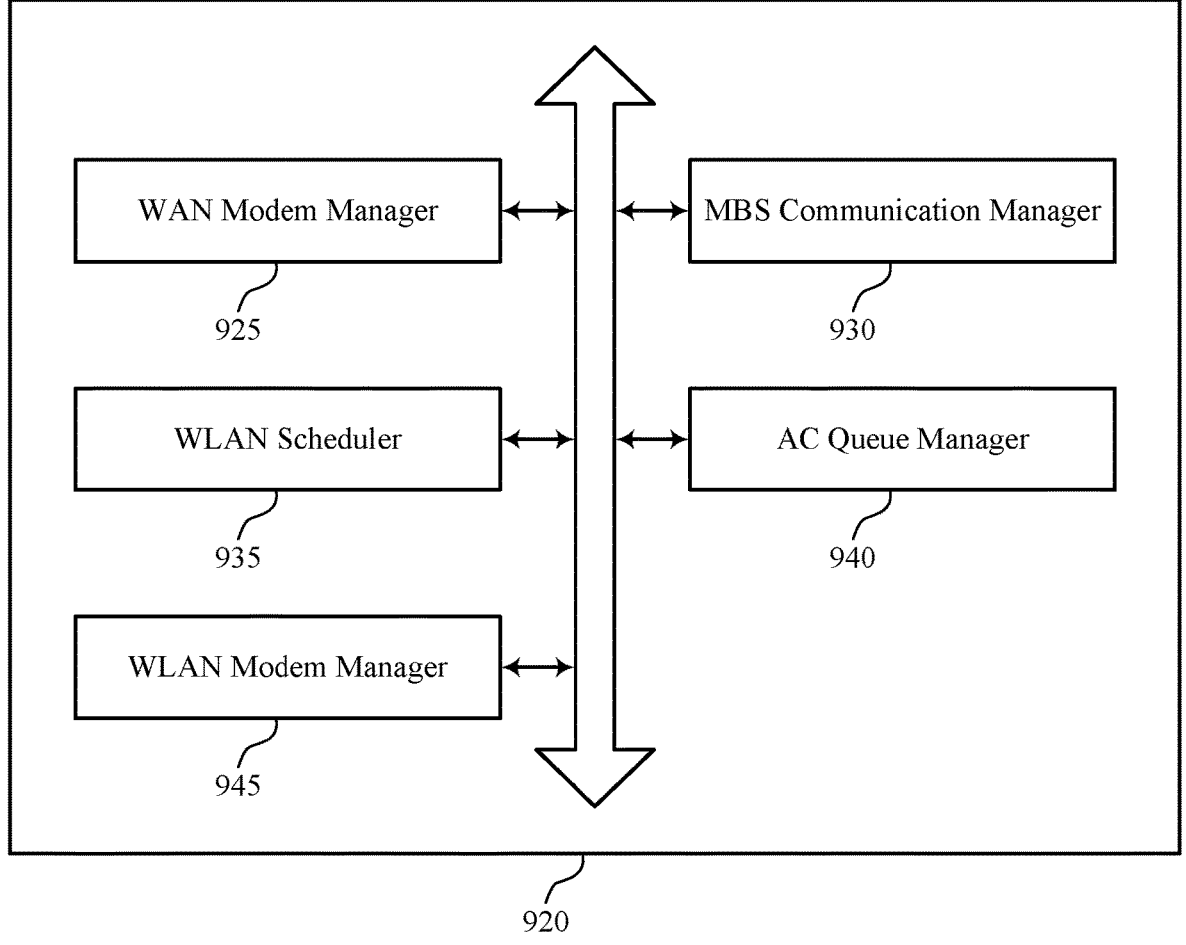
FIG. 9 shows a block diagram of a communications manager that supports broadcast traffic scheduling across multiple radio access technologies in accordance with one or more aspects of the present disclosure.

FIG. 9 shows a block diagram 900 of a communications manager 920 that supports broadcast traffic scheduling across multiple radio access technologies in accordance with one or more aspects of the present disclosure. The communications manager 920 may be an example of aspects of a communications manager 720, a communications manager 820, or both, as described herein. The communications manager 920, or various components thereof, may be an example of means for performing various aspects of broadcast traffic scheduling across multiple radio access technologies as described herein. For example, the communications manager 920 may include a WAN modem manager 925, an MBS communication manager 930, a WLAN scheduler 935, an AC queue manager 940, a WLAN modem manager 945, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communication in accordance with examples as disclosed herein. The WAN modem manager 925 may be configured as or otherwise support a means for receiving broadcast data associated with a broadcast service via a first wireless network using a first radio access technology, where the broadcast data is to be provided to a set of multiple clients via a second wireless network using a second radio access technology, and where the broadcast service has a set of broadcast service parameters. The MBS communication manager 930 may be configured as or otherwise support a means for transmitting, to a scheduler of the second wireless network, a broadcast session notification message that indicates one or more broadcast service parameters of the set of broadcast service parameters. In some examples, the MBS communication manager 930 may be configured as or otherwise support a means for transmitting the broadcast data to the scheduler for transmission via the second wireless network, where a broadcast indication is transmitted with the broadcast data that indicates the broadcast data is associated with the broadcast service.

In some examples, the MBS communication manager 930 may be configured as or otherwise support a means for receiving, from the scheduler, an indication to drop the broadcast service for the set of multiple clients. In some examples, the MBS communication manager 930 may be configured as or otherwise support a means for discontinuing transmission of the broadcast data to the scheduler. In some examples, the WAN modem manager 925 may be configured as or otherwise support a means for transmitting the broadcast data to the set of multiple clients using the first radio access technology.

In some examples, the MBS communication manager 930 may be configured as or otherwise support a means for receiving, subsequent to the indication to drop the broadcast service, an indication to resume the broadcast service for the set of multiple clients. In some examples, the MBS communication manager 930 may be configured as or otherwise support a means for resuming transmission of the broadcast data to the scheduler. In some examples, the MBS communication manager 930 may be configured as or otherwise support a means for discontinuing transmission of the broadcast data to the set of multiple clients using the first radio access technology. In some examples, the set of broadcast service parameters include one or more of a data rate target of the broadcast data, or an indication of whether the broadcast service is a solicited broadcast service or an unsolicited broadcast service. In some examples, the first wireless network is a 5G or 6G RAN and the second wireless network is a WLAN.

Additionally, or alternatively, the communications manager 920 may support wireless communication in accordance with examples as disclosed herein. The WLAN scheduler 935 may be configured as or otherwise support a means for receiving, from a wireless modem, a broadcast session notification message that indicates a set of broadcast service parameters associated with a broadcast service that is provided via the wireless modem using a first wireless network that uses a first RAT. The AC queue manager 940 may be configured as or otherwise support a means for mapping, based on one or more broadcast service parameters of the set of broadcast service parameters, the broadcast service to a background broadcast AC queue of a second wireless network that uses a second radio access technology. In some examples, the WAN modem manager 925 may be configured as or otherwise support a means for receiving, from the wireless modem, broadcast data and a broadcast indication associated with the broadcast service, where the broadcast data is to be transmitted to a set of multiple clients via the second wireless network using the second radio access technology. In some examples, the AC queue manager 940 may be configured as or otherwise support a means for buffering, based on the broadcast indication, the broadcast data in the background broadcast AC queue for transmission to the set of multiple clients via the second wireless network.

In some examples, the WLAN modem manager 945 may be configured as or otherwise support a means for receiving, from a first subset of the set of multiple clients, a solicitation request for the broadcast service. In some examples, the MBS communication manager 930 may be configured as or otherwise support a means for adding each client of the first subset of the set of multiple clients to a solicited client list.

In some examples, the AC queue manager 940 may be configured as or otherwise support a means for determining that an amount of data in the background broadcast AC queue exceeds a first threshold value. In some examples, the AC queue manager 940 may be configured as or otherwise support a means for transmitting the broadcast data from the background broadcast AC queue to the first subset of clients that are included on the solicited client list. In some examples, the AC queue manager 940 may be configured as or otherwise support a means for dropping the broadcast data from the background broadcast AC queue for a second subset of the set of multiple clients that are not included on the solicited client list.

In some examples, the AC queue manager 940 may be configured as or otherwise support a means for determining that the amount of data in the background broadcast AC queue exceeds a second threshold value, where the second threshold value is greater than the first threshold value. In some examples, the AC queue manager 940 may be configured as or otherwise support a means for dropping all broadcast data from the background broadcast AC queue for each of the set of multiple clients. In some examples, the WAN modem manager 925 may be configured as or otherwise support a means for transmitting an indication to the wireless modem to drop the broadcast service for the set of multiple clients.

In some examples, the WAN modem manager 925 may be configured as or otherwise support a means for receiving, subsequent to dropping all broadcast data, subsequent broadcast data associated with the broadcast service. In some examples, the AC queue manager 940 may be configured as or otherwise support a means for determining that the amount of data in the background broadcast AC queue is less than a third threshold value, where the third threshold value is greater than the first threshold value and less than the second threshold value. In some examples, the AC queue manager 940 may be configured as or otherwise support a means for resuming transmission of the broadcast data from the background broadcast AC queue to the first subset of clients that are included on the solicited client list.

In some examples, the AC queue manager 940 may be configured as or otherwise support a means for determining, subsequent to dropping the broadcast data from the background broadcast AC queue for a second subset of the set of multiple clients, that the amount of data in the background broadcast AC queue is less than a fourth threshold value, where the fourth threshold value is less than the first threshold value. In some examples, the AC queue manager 940 may be configured as or otherwise support a means for resuming transmission of the broadcast data from the background broadcast AC queue to each client of the set of multiple clients. In some examples, the one or more broadcast service parameters include one or more of a quantity of clients of the second wireless network, a quantity of clients that have solicited the broadcast service, one or more quality of service parameters associated with the broadcast service, or a data rate target of the broadcast service.

In some examples, the MBS communication manager 930 may be configured as or otherwise support a means for determining one or more threshold values for transmitting the broadcast data to one or more of the set of multiple clients based on the one or more broadcast service parameters. In some examples, the one or more threshold values include a first threshold value that indicates whether to transmit broadcast data to clients that have not solicited the broadcast service, and a second threshold value that indicates whether to discontinue transmission of the broadcast data to all of the set of multiple clients irrespective of whether the broadcast service was solicited. In some examples, the one or more threshold values are adjusted based on a status of one or more other AC queues.

In some examples, the WLAN modem manager 945 may be configured as or otherwise support a means for scheduling data transmissions associated with the broadcast service using orthogonal frequency division multiple access (OFDMA) or multi-user multiple-input-multiple-output (MU-MIMO) based on an associated capability of each of the set of multiple clients and a data rate associated with the broadcast service being above a data rate threshold value. In some examples, the first wireless network is a 5G or 6G radio access network and the second wireless network is a WLAN.

Figure 10:
FIG. 10 shows a diagram of a system including a UE that supports broadcast traffic scheduling across multiple radio access technologies in accordance with one or more aspects of the present disclosure.

FIG. 10 shows a diagram of a system 1000 including a device 1005 that supports broadcast traffic scheduling across multiple radio access technologies in accordance with one or more aspects of the present disclosure. The device 1005 may be an example of or include the components of a device 705, a device 805, a CPE 185, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. The transceiver 1010, or the transceiver 1010 and one or more antennas 1015 or wired interfaces, where applicable, may be an example of a transmitter 715, a transmitter 815, a receiver 710, a receiver 810, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1025 may include random access memory (RAM) and read-only memory (ROM). The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a basic input/output (I/O) system (BIOS) which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting broadcast traffic scheduling across multiple radio access technologies). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communication in accordance with examples as disclosed herein. For example, the communications manager 1020 may be configured as or otherwise support a means for receiving broadcast data associated with a broadcast service via a first wireless network using a first radio access technology, where the broadcast data is to be provided to a set of multiple clients via a second wireless network using a second radio access technology, and where the broadcast service has a set of broadcast service parameters. The communications manager 1020 may be configured as or otherwise support a means for transmitting, to a scheduler of the second wireless network, a broadcast session notification message that indicates one or more broadcast service parameters of the set of broadcast service parameters. The communications manager 1020 may be configured as or otherwise support a means for transmitting the broadcast data to the scheduler for transmission via the second wireless network, where a broadcast indication is transmitted with the broadcast data that indicates the broadcast data is associated with the broadcast service.

Additionally, or alternatively, the communications manager 1020 may support wireless communication in accordance with examples as disclosed herein. For example, the communications manager 1020 may be configured as or otherwise support a means for receiving, from a wireless modem, a broadcast session notification message that indicates a set of broadcast service parameters associated with a broadcast service that is provided via the wireless modem using a first wireless network that uses a first radio access technology. The communications manager 1020 may be configured as or otherwise support a means for mapping, based at least in part on one or more broadcast service parameters of the set of broadcast service parameters, the broadcast service to a background broadcast AC queue of a second wireless network that uses a second radio access technology. The communications manager 1020 may be configured as or otherwise support a means for receiving, from the wireless modem, broadcast data and a broadcast indication associated with the broadcast service, where the broadcast data is to be transmitted to a set of multiple clients via the second wireless network using the second radio access technology. The communications manager 1020 may be configured as or otherwise support a means for buffering, based at least in part on the broadcast indication, the broadcast data in the background broadcast AC queue for transmission to the set of multiple clients via the second wireless network.

By including or configuring the communications manager 1020 in accordance with examples as described herein, the device 1005 may support techniques for prioritization of broadcast communications in traffic scheduling across multiple RATs that provide enhanced reliability for broadcast flows that are transmitted across multiple RAT to a UE, enhance network efficiency, and provide an enhanced user experience.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the processor 1035, the memory 1025, the code 1030, the transceiver 1010, or any combination thereof. For example, the code 1030 may include instructions executable by the processor 1035 to cause the device 1005 to perform various aspects of broadcast traffic scheduling across multiple radio access technologies as described herein, or the processor 1035 and the memory 1025 may be otherwise configured to perform or support such operations.

Figure 11:
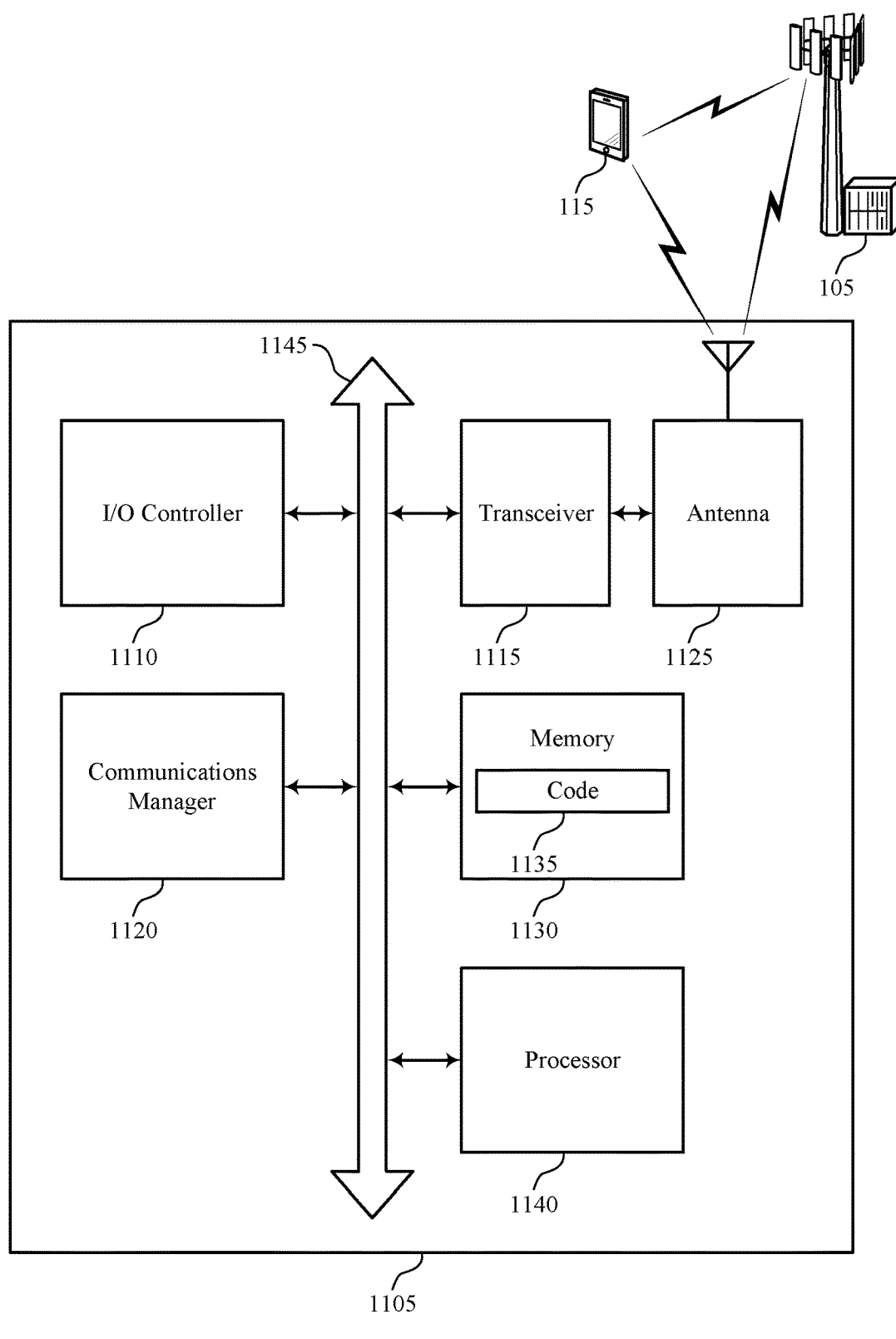
FIG. 11 shows a diagram of a system including a network entity that supports broadcast traffic scheduling across multiple radio access technologies in accordance with one or more aspects of the present disclosure.

FIG. 11 shows a diagram of a system 1100 including a device 1105 that supports broadcast traffic scheduling across multiple radio access technologies in accordance with one or more aspects of the present disclosure. The device 1105 may be an example of or include the components of a device 705, a device 805, a CPE 185, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 715, a transmitter 815, a receiver 710, a receiver 810, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting broadcast traffic scheduling across multiple radio access technologies). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication in accordance with examples as disclosed herein. For example, the communications manager 1120 may be configured as or otherwise support a means for receiving broadcast data associated with a broadcast service via a first wireless network using a first radio access technology, where the broadcast data is to be provided to a set of multiple clients via a second wireless network using a second radio access technology, and where the broadcast service has a set of broadcast service parameters. The communications manager 1120 may be configured as or otherwise support a means for transmitting, to a scheduler of the second wireless network, a broadcast session notification message that indicates one or more broadcast service parameters of the set of broadcast service parameters. The communications manager 1120 may be configured as or otherwise support a means for transmitting the broadcast data to the scheduler for transmission via the second wireless network, where a broadcast indication is transmitted with the broadcast data that indicates the broadcast data is associated with the broadcast service.

Additionally, or alternatively, the communications manager 1120 may support wireless communication in accordance with examples as disclosed herein. For example, the communications manager 1120 may be configured as or otherwise support a means for receiving, from a wireless modem, a broadcast session notification message that indicates a set of broadcast service parameters associated with a broadcast service that is provided via the wireless modem using a first wireless network that uses a first radio access technology. The communications manager 1120 may be configured as or otherwise support a means for mapping, based at least in part on one or more broadcast service parameters of the set of broadcast service parameters, the broadcast service to a background broadcast AC queue of a second wireless network that uses a second radio access technology. The communications manager 1120 may be configured as or otherwise support a means for receiving, from the wireless modem, broadcast data and a broadcast indication associated with the broadcast service, where the broadcast data is to be transmitted to a set of multiple clients via the second wireless network using the second radio access technology. The communications manager 1120 may be configured as or otherwise support a means for buffering, based at least in part on the broadcast indication, the broadcast data in the background broadcast AC queue for transmission to the set of multiple clients via the second wireless network.

By including or configuring the communications manager 1120 in accordance with examples as described herein, the device 1105 may support techniques for prioritization of broadcast communications in traffic scheduling across multiple RATs that provide enhanced reliability for broadcast flows that are transmitted across multiple RAT to a UE, enhance network efficiency, and provide an enhanced user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of broadcast traffic scheduling across multiple radio access technologies as described herein, or the processor 1140 and the memory 1130 may be otherwise configured to perform or support such operations.

FIG. 12 shows a flowchart illustrating a method 1200 that supports broadcast traffic scheduling across multiple radio access technologies in accordance with one or more aspects of the present disclosure. The operations of the method 1200 may be implemented by a network entity, a CPE, or a UE or its components as described herein. For example, the operations of the method 1200 may be performed by a network entity, a CPE, or a UE 115 as described with reference to FIGS. 1 through 11. In some examples, a network entity, a CPE, or a UE may execute a set of instructions to control the functional elements of the network entity, the CPE, or the UE to perform the described functions. Additionally, or alternatively, the network entity, the CPE, or the UE may perform aspects of the described functions using special-purpose hardware.

At 1205, the method may include receiving broadcast data associated with a broadcast service via a first wireless network using a first radio access technology, where the broadcast data is to be provided to a set of multiple clients via a second wireless network using a second radio access technology, and where the broadcast service has a set of broadcast service parameters. The operations of 1205 may be performed in accordance with examples as disclosed herein. In some examples, aspects of the operations of 1205 may be performed by a WAN modem manager 925 as described with reference to FIG. 9.

At 1210, the method may include transmitting, to a scheduler of the second wireless network, a broadcast session notification message that indicates one or more broadcast service parameters of the set of broadcast service parameters. The operations of 1210 may be performed in accordance with examples as disclosed herein. In some examples, aspects of the operations of 1210 may be performed by an MBS communication manager 930 as described with reference to FIG. 9.

At 1215, the method may include transmitting the broadcast data to the scheduler for transmission via the second wireless network, where a broadcast indication is transmitted with the broadcast data that indicates the broadcast data is associated with the broadcast service. The operations of 1215 may be performed in accordance with examples as disclosed herein. In some examples, aspects of the operations of 1215 may be performed by an MBS communication manager 930 as described with reference to FIG. 9.

FIG. 13 shows a flowchart illustrating a method 1300 that supports broadcast traffic scheduling across multiple radio access technologies in accordance with one or more aspects of the present disclosure. The operations of the method 1300 may be implemented by a network entity, a CPE, or a UE or its components as described herein. For example, the operations of the method 1300 may be performed by a network entity, a CPE, or a UE 115 as described with reference to FIGS. 1 through 11. In some examples, a network entity, a CPE, or a UE may execute a set of instructions to control the functional elements of the network entity, the CPE, or the UE to perform the described functions. Additionally, or alternatively, the network entity, the CPE, or the UE may perform aspects of the described functions using special-purpose hardware.

At 1305, the method may include receiving broadcast data associated with a broadcast service via a first wireless network using a first radio access technology, where the broadcast data is to be provided to a set of multiple clients via a second wireless network using a second radio access technology, and where the broadcast service has a set of broadcast service parameters. The operations of 1305 may be performed in accordance with examples as disclosed herein. In some examples, aspects of the operations of 1305 may be performed by a WAN modem manager 925 as described with reference to FIG. 9.

At 1310, the method may include transmitting, to a scheduler of the second wireless network, a broadcast session notification message that indicates one or more broadcast service parameters of the set of broadcast service parameters. The operations of 1310 may be performed in accordance with examples as disclosed herein. In some examples, aspects of the operations of 1310 may be performed by an MBS communication manager 930 as described with reference to FIG. 9.

At 1315, the method may include transmitting the broadcast data to the scheduler for transmission via the second wireless network, where a broadcast indication is transmitted with the broadcast data that indicates the broadcast data is associated with the broadcast service. The operations of 1315 may be performed in accordance with examples as disclosed herein. In some examples, aspects of the operations of 1315 may be performed by an MBS communication manager 930 as described with reference to FIG. 9.

At 1320, the method may include receiving, from the scheduler, an indication to drop the broadcast service for the set of multiple clients. The operations of 1320 may be performed in accordance with examples as disclosed herein. In some examples, aspects of the operations of 1320 may be performed by an MBS communication manager 930 as described with reference to FIG. 9.

At 1325, the method may include discontinuing transmission of the broadcast data to the scheduler. The operations of 1325 may be performed in accordance with examples as disclosed herein. In some examples, aspects of the operations of 1325 may be performed by an MBS communication manager 930 as described with reference to FIG. 9.

At 1330, the method may include receiving, subsequent to the indication to drop the broadcast service, an indication to resume the broadcast service for the set of multiple clients. The operations of 1330 may be performed in accordance with examples as disclosed herein. In some examples, aspects of the operations of 1330 may be performed by an MBS communication manager 930 as described with reference to FIG. 9.

At 1335, the method may include resuming transmission of the broadcast data to the scheduler. The operations of 1335 may be performed in accordance with examples as disclosed herein. In some examples, aspects of the operations of 1335 may be performed by an MBS communication manager 930 as described with reference to FIG. 9.

FIG. 14 shows a flowchart illustrating a method 1400 that supports broadcast traffic scheduling across multiple radio access technologies in accordance with one or more aspects of the present disclosure. The operations of the method 1400 may be implemented by a network entity, a CPE, or a UE or its components as described herein. For example, the operations of the method 1400 may be performed by a network entity, a CPE, or a UE 115 as described with reference to FIGS. 1 through 11. In some examples, a network entity, a CPE, or a UE may execute a set of instructions to control the functional elements of the network entity, the CPE, or the UE to perform the described functions. Additionally, or alternatively, the network entity, the CPE, or the UE may perform aspects of the described functions using special-purpose hardware.

At 1405, the method may include receiving, from a wireless modem, a broadcast session notification message that indicates a set of broadcast service parameters associated with a broadcast service that is provided via the wireless modem using a first wireless network that uses a first radio access technology. The operations of 1405 may be performed in accordance with examples as disclosed herein. In some examples, aspects of the operations of 1405 may be performed by a WLAN scheduler 935 as described with reference to FIG. 9.

At 1410, the method may include mapping, based on one or more broadcast service parameters of the set of broadcast service parameters, the broadcast service to a background broadcast AC queue of a second wireless network that uses a second radio access technology. The operations of 1410 may be performed in accordance with examples as disclosed herein. In some examples, aspects of the operations of 1410 may be performed by an AC queue manager 940 as described with reference to FIG. 9.

At 1415, the method may include receiving, from the wireless modem, broadcast data and a broadcast indication associated with the broadcast service, where the broadcast data is to be transmitted to a set of multiple clients via the second wireless network using the second radio access technology. The operations of 1415 may be performed in accordance with examples as disclosed herein. In some examples, aspects of the operations of 1415 may be performed by a WAN modem manager 925 as described with reference to FIG. 9.

At 1420, the method may include buffering, based on the broadcast indication, the broadcast data in the background broadcast AC queue for transmission to the set of multiple clients via the second wireless network. The operations of 1420 may be performed in accordance with examples as disclosed herein. In some examples, aspects of the operations of 1420 may be performed by an AC queue manager 940 as described with reference to FIG. 9.

FIG. 15 shows a flowchart illustrating a method 1500 that supports broadcast traffic scheduling across multiple radio access technologies in accordance with one or more aspects of the present disclosure. The operations of the method 1500 may be implemented by a network entity, a CPE, or a UE or its components as described herein. For example, the operations of the method 1500 may be performed by a network entity, a CPE, or a UE 115 as described with reference to FIGS. 1 through 11. In some examples, a network entity, a CPE, or a UE may execute a set of instructions to control the functional elements of the network entity, the CPE, or the UE to perform the described functions. Additionally, or alternatively, the network entity, the CPE, or the UE may perform aspects of the described functions using special-purpose hardware.

At 1505, the method may include receiving a broadcast session notification message. The operations of 1505 may be performed in accordance with examples as disclosed herein. In some examples, aspects of the operations of 1505 may be performed by a WLAN scheduler 935 as described with reference to FIG. 9. As discussed herein, in some cases the broadcast session notification message may be received from a wireless modem, a broadcast session notification message that indicates a set of broadcast service parameters associated with a broadcast service that is provided via the wireless modem using a first wireless network that uses a first radio access technology.

At 1510, the method may include mapping, based on one or more broadcast service parameters of the set of broadcast service parameters, the broadcast service to a background broadcast AC queue of a second wireless network that uses a second radio access technology. The operations of 1510 may be performed in accordance with examples as disclosed herein. In some examples, aspects of the operations of 1510 may be performed by an AC queue manager 940 as described with reference to FIG. 9.

At 1515, the method may include receiving, from a first subset of the set of multiple clients, a solicitation request for the broadcast service. The operations of 1515 may be performed in accordance with examples as disclosed herein. In some examples, aspects of the operations of 1515 may be performed by a WLAN modem manager 945 as described with reference to FIG. 9.

At 1520, the method may include adding each client of the first subset of the set of multiple clients to a solicited client list. The operations of 1520 may be performed in accordance with examples as disclosed herein. In some examples, aspects of the operations of 1520 may be performed by an MBS communication manager 930 as described with reference to FIG. 9.

At 1525, the method may include receiving, from the wireless modem, broadcast data and a broadcast indication associated with the broadcast service, where the broadcast data is to be transmitted to a set of multiple clients via the second wireless network using the second radio access technology. The operations of 1525 may be performed in accordance with examples as disclosed herein. In some examples, aspects of the operations of 1525 may be performed by a WAN modem manager 925 as described with reference to FIG. 9.

At 1530, the method may include buffering, based on the broadcast indication, the broadcast data in the background broadcast AC queue for transmission to the set of multiple clients via the second wireless network. The operations of 1530 may be performed in accordance with examples as disclosed herein. In some examples, aspects of the operations of 1530 may be performed by an AC queue manager 940 as described with reference to FIG. 9.

At 1535, the method may include determining that an amount of data in the background broadcast AC queue exceeds a first threshold value. The operations of 1535 may be performed in accordance with examples as disclosed herein. In some examples, aspects of the operations of 1535 may be performed by an AC queue manager 940 as described with reference to FIG. 9.

At 1540, the method may include transmitting the broadcast data from the background broadcast AC queue to the first subset of clients that are included on the solicited client list. The operations of 1540 may be performed in accordance with examples as disclosed herein. In some examples, aspects of the operations of 1540 may be performed by an AC queue manager 940 as described with reference to FIG. 9.

At 1545, the method may include dropping the broadcast data from the background broadcast AC queue for a second subset of the set of multiple clients that are not included on the solicited client list. The operations of 1545 may be performed in accordance with examples as disclosed herein. In some examples, aspects of the operations of 1545 may be performed by an AC queue manager 940 as described with reference to FIG. 9.

At 1550, the method may include determining that the amount of data in the background broadcast AC queue exceeds a second threshold value, where the second threshold value is greater than the first threshold value. The operations of 1550 may be performed in accordance with examples as disclosed herein. In some examples, aspects of the operations of 1550 may be performed by an AC queue manager 940 as described with reference to FIG. 9.

At 1555, the method may include dropping all broadcast data from the background broadcast AC queue for each of the set of multiple clients. The operations of 1555 may be performed in accordance with examples as disclosed herein. In some examples, aspects of the operations of 1555 may be performed by an AC queue manager 940 as described with reference to FIG. 9.

At 1560, the method may include transmitting an indication to the wireless modem to drop the broadcast service for the set of multiple clients. The operations of 1560 may be performed in accordance with examples as disclosed herein. In some examples, aspects of the operations of 1560 may be performed by a WAN modem manager 925 as described with reference to FIG. 9.

At 1565, the method may include receiving, subsequent to dropping all broadcast data, subsequent broadcast data associated with the broadcast service. The operations of 1565 may be performed in accordance with examples as disclosed herein. In some examples, aspects of the operations of 1565 may be performed by a WAN modem manager 925 as described with reference to FIG. 9.

At 1570, the method may include determining that the amount of data in the background broadcast AC queue is less than a third threshold value, where the third threshold value is greater than the first threshold value and less than the second threshold value. The operations of 1570 may be performed in accordance with examples as disclosed herein. In some examples, aspects of the operations of 1570 may be performed by an AC queue manager 940 as described with reference to FIG. 9.

At 1575, the method may include resuming transmission of the broadcast data from the background broadcast AC queue to the first subset of clients that are included on the solicited client list. The operations of 1575 may be performed in accordance with examples as disclosed herein. In some examples, aspects of the operations of 1575 may be performed by an AC queue manager 940 as described with reference to FIG. 9.

FIG. 16 shows a flowchart illustrating a method 1600 that supports broadcast traffic scheduling across multiple radio access technologies in accordance with one or more aspects of the present disclosure. The operations of the method 1600 may be implemented by a network entity, a CPE, or a UE or its components as described herein. For example, the operations of the method 1600 may be performed by a network entity, a CPE, or a UE 115 as described with reference to FIGS. 1 through 11. In some examples, a network entity, a CPE, or a UE may execute a set of instructions to control the functional elements of the network entity, the CPE, or the UE to perform the described functions. Additionally, or alternatively, the network entity, the CPE, or the UE may perform aspects of the described functions using special-purpose hardware.

At 1605, the method may include receiving a broadcast session notification message. The operations of 1605 may be performed in accordance with examples as disclosed herein. In some examples, aspects of the operations of 1605 may be performed by a WLAN scheduler 935 as described with reference to FIG. 9. As discussed herein, in some cases the broadcast session notification message may be received from a wireless modem, a broadcast session notification message that indicates a set of broadcast service parameters associated with a broadcast service that is provided via the wireless modem using a first wireless network that uses a first radio access technology.

At 1610, the method may include mapping, based on one or more broadcast service parameters of the set of broadcast service parameters, the broadcast service to a background broadcast AC queue of a second wireless network that uses a second radio access technology. The operations of 1610 may be performed in accordance with examples as disclosed herein. In some examples, aspects of the operations of 1610 may be performed by an AC queue manager 940 as described with reference to FIG. 9.

At 1615, the method may include receiving, from a first subset of the set of multiple clients, a solicitation request for the broadcast service. The operations of 1615 may be performed in accordance with examples as disclosed herein. In some examples, aspects of the operations of 1615 may be performed by a WLAN modem manager 945 as described with reference to FIG. 9.

At 1620, the method may include adding each client of the first subset of the set of multiple clients to a solicited client list. The operations of 1620 may be performed in accordance with examples as disclosed herein. In some examples, aspects of the operations of 1620 may be performed by an MBS communication manager 930 as described with reference to FIG. 9.

At 1625, the method may include receiving, from the wireless modem, broadcast data and a broadcast indication associated with the broadcast service, where the broadcast data is to be transmitted to a set of multiple clients via the second wireless network using the second radio access technology. The operations of 1625 may be performed in accordance with examples as disclosed herein. In some examples, aspects of the operations of 1625 may be performed by a WAN modem manager 925 as described with reference to FIG. 9.

At 1630, the method may include buffering, based on the broadcast indication, the broadcast data in the background broadcast AC queue for transmission to the set of multiple clients via the second wireless network. The operations of 1630 may be performed in accordance with examples as disclosed herein. In some examples, aspects of the operations of 1630 may be performed by an AC queue manager 940 as described with reference to FIG. 9.

At 1635, the method may include determining that an amount of data in the background broadcast AC queue exceeds a first threshold value. The operations of 1635 may be performed in accordance with examples as disclosed herein. In some examples, aspects of the operations of 1635 may be performed by an AC queue manager 940 as described with reference to FIG. 9.

At 1640, the method may include transmitting the broadcast data from the background broadcast AC queue to the first subset of clients that are included on the solicited client list. The operations of 1640 may be performed in accordance with examples as disclosed herein. In some examples, aspects of the operations of 1640 may be performed by an AC queue manager 940 as described with reference to FIG. 9.

At 1645, the method may include dropping the broadcast data from the background broadcast AC queue for a second subset of the set of multiple clients that are not included on the solicited client list. The operations of 1645 may be performed in accordance with examples as disclosed herein. In some examples, aspects of the operations of 1645 may be performed by an AC queue manager 940 as described with reference to FIG. 9.

At 1650, the method may include determining, subsequent to dropping the broadcast data from the background broadcast AC queue for a second subset of the set of multiple clients, that the amount of data in the background broadcast AC queue is less than a fourth threshold value, where the fourth threshold value is less than the first threshold value. The operations of 1650 may be performed in accordance with examples as disclosed herein. In some examples, aspects of the operations of 1650 may be performed by an AC queue manager 940 as described with reference to FIG. 9.

At 1655, the method may include resuming transmission of the broadcast data from the background broadcast AC queue to each client of the set of multiple clients. The operations of 1655 may be performed in accordance with examples as disclosed herein. In some examples, aspects of the operations of 1655 may be performed by an AC queue manager 940 as described with reference to FIG. 9.

The following provides an overview of aspects of the present disclosure:

Aspect 1: A method for wireless communication, comprising: receiving broadcast data associated with a broadcast service via a first wireless network using a first radio access technology, wherein the broadcast data is to be provided to a plurality of clients via a second wireless network using a second radio access technology, and wherein the broadcast service has a set of broadcast service parameters; transmitting, to a scheduler of the second wireless network, a broadcast session notification message that indicates one or more broadcast service parameters of the set of broadcast service parameters; and transmitting the broadcast data to the scheduler for transmission via the second wireless network, wherein a broadcast indication is transmitted with the broadcast data that indicates the broadcast data is associated with the broadcast service.

Aspect 2: The method of aspect 1, further comprising: receiving, from the scheduler, an indication to drop the broadcast service for the plurality of clients; and discontinuing transmission of the broadcast data to the scheduler.

Aspect 3: The method of aspect 2, further comprising: transmitting the broadcast data to the plurality of clients using the first radio access technology.

Aspect 4: The method of aspect 3, further comprising: receiving, subsequent to the indication to drop the broadcast service, an indication to resume the broadcast service for the plurality of clients; resuming transmission of the broadcast data to the scheduler; and discontinuing transmission of the broadcast data to the plurality of clients using the first radio access technology.

Aspect 5: The method of any of aspects 1 through 4, wherein the set of broadcast service parameters include one or more of a data rate target of the broadcast data, or an indication of whether the broadcast service is a solicited broadcast service or an unsolicited broadcast service.

Aspect 6: The method of any of aspects 1 through 5, wherein the first wireless network is a 5G or 6G radio access network and the second wireless network is a WLAN.

Aspect 7: A method for wireless communication, comprising: receiving, from a wireless modem, a broadcast session notification message that indicates a set of broadcast service parameters associated with a broadcast service that is provided via the wireless modem using a first wireless network that uses a first radio access technology; mapping, based at least in part on one or more broadcast service parameters of the set of broadcast service parameters, the broadcast service to a background broadcast access category queue of a second wireless network that uses a second radio access technology; receiving, from the wireless modem, broadcast data and a broadcast indication associated with the broadcast service, wherein the broadcast data is to be transmitted to a plurality of clients via the second wireless network using the second radio access technology; and buffering, based at least in part on the broadcast indication, the broadcast data in the background broadcast access category queue for transmission to the plurality of clients via the second wireless network.

Aspect 8: The method of aspect 7, further comprising: receiving, from a first subset of the plurality of clients, a solicitation request for the broadcast service; and adding each client of the first subset of the plurality of clients to a solicited client list.

Aspect 9: The method of aspect 8, further comprising: determining that an amount of data in the background broadcast access category queue exceeds a first threshold value; transmitting the broadcast data from the background broadcast access category queue to the first subset of clients that are included on the solicited client list; and dropping the broadcast data from the background broadcast access category queue for a second subset of the plurality of clients that are not included on the solicited client list.

Aspect 10: The method of aspect 9, further comprising: determining that the amount of data in the background broadcast access category queue exceeds a second threshold value, wherein the second threshold value is greater than the first threshold value; dropping all broadcast data from the background broadcast access category queue for each of the plurality of clients; and transmitting an indication to the wireless modem to drop the broadcast service for the plurality of clients.

Aspect 11: The method of aspect 10, further comprising: receiving, subsequent to dropping all broadcast data, subsequent broadcast data associated with the broadcast service; determining that the amount of data in the background broadcast access category queue is less than a third threshold value, wherein the third threshold value is greater than the first threshold value and less than the second threshold value; and resuming transmission of the broadcast data from the background broadcast access category queue to the first subset of clients that are included on the solicited client list.

Aspect 12: The method of any of aspects 9 through 11, further comprising: determining, subsequent to dropping the broadcast data from the background broadcast access category queue for a second subset of the plurality of clients, that the amount of data in the background broadcast access category queue is less than a fourth threshold value, wherein the fourth threshold value is less than the first threshold value; and resuming transmission of the broadcast data from the background broadcast access category queue to each client of the plurality of clients.

Aspect 13: The method of any of aspects 7 through 12, wherein the one or more broadcast service parameters include one or more of a quantity of clients of the second wireless network, a quantity of clients that have solicited the broadcast service, one or more quality of service parameters associated with the broadcast service, or a data rate target of the broadcast service.

Aspect 14: The method of aspect 13, further comprising: determining one or more threshold values for transmitting the broadcast data to one or more of the plurality of clients based at least in part on the one or more broadcast service parameters.

Aspect 15: The method of aspect 14, wherein the one or more threshold values include a first threshold value that indicates whether to transmit broadcast data to clients that have not solicited the broadcast service, and a second threshold value that indicates whether to discontinue transmission of the broadcast data to all of the plurality of clients irrespective of whether the broadcast service was solicited.

Aspect 16: The method of any of aspects 14 through 15, wherein the one or more threshold values are adjusted based at least in part on a status of one or more other access category queues.

Aspect 17: The method of any of aspects 7 through 16, further comprising: scheduling data transmissions associated with the broadcast service using OFDMA or MU-MIMO based at least in part on an associated capability of each of the plurality of clients and a data rate associated with the broadcast service being above a data rate threshold value.

Aspect 18: The method of any of aspects 7 through 17, wherein the first wireless network is a 5G or 6G radio access network and the second wireless network is a WLAN.

Aspect 19: An apparatus for wireless communication, comprising a processor; memory coupled with the processor; and instructions stored in the memory and executable by the processor to cause the apparatus to perform a method of any of aspects 1 through 6.

Aspect 20: An apparatus for wireless communication, comprising at least one means for performing a method of any of aspects 1 through 6.

Aspect 21: A non-transitory computer-readable medium storing code for wireless communication, the code comprising instructions executable by a processor to perform a method of any of aspects 1 through 6.

Aspect 22: An apparatus for wireless communication, comprising a processor; memory coupled with the processor; and instructions stored in the memory and executable by the processor to cause the apparatus to perform a method of any of aspects 7 through 18.

Aspect 23: An apparatus for wireless communication, comprising at least one means for performing a method of any of aspects 7 through 18.

Aspect 24: A non-transitory computer-readable medium storing code for wireless communication, the code comprising instructions executable by a processor to perform a method of any of aspects 7 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:

receiving, via one or more wireless communications of a first wireless network using a first radio access technology, broadcast data associated with a broadcast service, wherein the broadcast data is to be provided to a plurality of clients via a scheduler of a second wireless network using a second radio access technology in accordance with a background broadcast access category queue at the scheduler of the second wireless network that uses the second radio access technology, and wherein the first wireless network is different than the second wireless network, the first radio access technology is different than the second radio access technology, and the broadcast service has a set of broadcast service parameters;

transmitting, to the scheduler of the second wireless network, a broadcast session notification message that indicates one or more broadcast service parameters of the set of broadcast service parameters; and transmitting the broadcast data to the scheduler for transmission to the plurality of clients via the second wireless network in accordance with one or more threshold values corresponding to an amount of broadcast data in the background broadcast access category queue, wherein a broadcast indication is transmitted with the broadcast data that indicates the broadcast data is associated with the broadcast service.

2. The method of claim 1, further comprising:

receiving, from the scheduler, an indication to drop the broadcast service for the plurality of clients; and discontinuing transmission of the broadcast data to the scheduler.

3. The method of claim 2, further comprising:

transmitting the broadcast data to the plurality of clients using the first radio access technology.

4. The method of claim 3, further comprising:

receiving, subsequent to the indication to drop the broadcast service, an indication to resume the broadcast service for the plurality of clients;

resuming transmission of the broadcast data to the scheduler; and discontinuing transmission of the broadcast data to the plurality of clients using the first radio access technology.

5. The method of claim 1, wherein the set of broadcast service parameters include one or more of a data rate target of the broadcast data, or an indication of whether the broadcast service is a solicited broadcast service or an unsolicited broadcast service.

6. The method of claim 1, wherein the first wireless network is a fifth generation (5G) or sixth generation (6G) radio access network and the second wireless network is a wireless local area network (WLAN).

7. A method for wireless communication, comprising:

receiving, from a wireless modem, a broadcast session notification message that indicates a set of broadcast service parameters associated with a broadcast service that is provided via the wireless modem using a first wireless network that uses a first radio access technology;

mapping, based at least in part on one or more broadcast service parameters of the set of broadcast service parameters, the broadcast service to a background broadcast access category queue at a scheduler of a second wireless network that uses a second radio access technology, wherein the first wireless network is different than the second wireless network, and the first radio access technology is different than the second radio access technology;

receiving, from the wireless modem, broadcast data and a broadcast indication associated with the broadcast service that is provided using the first wireless network and the first radio access technology, wherein the broadcast data is to be transmitted to a plurality of clients via the scheduler of the second wireless network using the second radio access technology; and buffering, based at least in part on the broadcast indication, the broadcast data in the background broadcast access category queue for transmission to the plurality of clients via the second wireless network in accordance with one or more threshold values corresponding to an amount of broadcast data in the background broadcast access category queue.

8. The method of claim 7, further comprising:

receiving, from a first subset of the plurality of clients, a solicitation request for the broadcast service; and adding each client of the first subset of the plurality of clients to a solicited client list.

9. The method of claim 8, further comprising:

determining that an amount of data in the background broadcast access category queue exceeds a first threshold value;

transmitting the broadcast data from the background broadcast access category queue to the first subset of the plurality of clients that are included on the solicited client list; and dropping the broadcast data from the background broadcast access category queue for a second subset of the plurality of clients that are not included on the solicited client list.

10. The method of claim 9, further comprising:

determining that the amount of data in the background broadcast access category queue exceeds a second threshold value, wherein the second threshold value is greater than the first threshold value;

dropping all broadcast data from the background broadcast access category queue for each of the plurality of clients; and transmitting an indication to the wireless modem to drop the broadcast service for the plurality of clients.

11. The method of claim 10, further comprising:

receiving, subsequent to dropping all broadcast data, subsequent broadcast data associated with the broadcast service;

determining that the amount of data in the background broadcast access category queue is less than a third threshold value, wherein the third threshold value is greater than the first threshold value and less than the second threshold value; and resuming transmission of the broadcast data from the background broadcast access category queue to the first subset of the plurality of clients that are included on the solicited client list.

12. The method of claim 9, further comprising:

determining, subsequent to dropping the broadcast data from the background broadcast access category queue for the second subset of the plurality of clients, that the amount of data in the background broadcast access category queue is less than a fourth threshold value, wherein the fourth threshold value is less than the first threshold value; and resuming transmission of the broadcast data from the background broadcast access category queue to each client of the plurality of clients.

13. The method of claim 7, wherein the one or more broadcast service parameters include one or more of a quantity of clients of the second wireless network, a quantity of clients that have solicited the broadcast service, one or more quality of service parameters associated with the broadcast service, or a data rate target of the broadcast service.

14. The method of claim 13, further comprising:

determining the one or more threshold values for transmitting the broadcast data to one or more of the plurality of clients based at least in part on the one or more broadcast service parameters.

15. The method of claim 14, wherein the one or more threshold values include a first threshold value that indicates whether to transmit broadcast data to clients that have not solicited the broadcast service, and a second threshold value that indicates whether to discontinue transmission of the broadcast data to all of the plurality of clients irrespective of whether the broadcast service was solicited.

16. The method of claim 14, wherein the one or more threshold values are adjusted based at least in part on a status of one or more other access category queues.

17. The method of claim 7, further comprising:

scheduling data transmissions associated with the broadcast service using orthogonal frequency division multiple access (OFDMA) or multi-user multiple-input-multiple-output (MU-MIMO) based at least in part on an associated capability of each of the plurality of clients and a data rate associated with the broadcast service being above a data rate threshold value.

18. The method of claim 7, wherein the first wireless network is a fifth generation (5G) or sixth generation (6G) radio access network and the second wireless network is a wireless local area network (WLAN).

19. An apparatus for wireless communication, comprising:

a processor;

memory coupled with the processor; and instructions stored in the memory and executable by the processor to cause the apparatus to:

receive, via one or more wireless communications of a first wireless network using a first radio access technology, broadcast data associated with a broadcast service, wherein the broadcast data is to be provided to a plurality of clients via a scheduler of a second wireless network using a second radio access technology in accordance with a background broadcast access category queue at the scheduler of the second wireless network that uses the second radio access technology, and wherein the first wireless network is different than the second wireless network, the first radio access technology is different than the second radio access technology, and the broadcast service has a set of broadcast service parameters;

transmit, to the scheduler of the second wireless network, a broadcast session notification message that indicates one or more broadcast service parameters of the set of broadcast service parameters; and transmit the broadcast data to the scheduler for transmission to the plurality of clients via the second wireless network in accordance with one or more threshold values corresponding to an amount of broadcast data in the background broadcast access category queue, wherein a broadcast indication is transmitted with the broadcast data that indicates the broadcast data is associated with the broadcast service.

20. The apparatus of claim 19, wherein the instructions are further executable by the processor to cause the apparatus to:

receive, from the scheduler, an indication to drop the broadcast service for the plurality of clients; and discontinue transmission of the broadcast data to the scheduler.

21. The apparatus of claim 20, wherein the instructions are further executable by the processor to cause the apparatus to:

transmit the broadcast data to the plurality of clients using the first radio access technology.

22. The apparatus of claim 21, wherein the instructions are further executable by the processor to cause the apparatus to:

receive, subsequent to the indication to drop the broadcast service, an indication to resume the broadcast service for the plurality of clients;

resume transmission of the broadcast data to the scheduler; and discontinue transmission of the broadcast data to the plurality of clients using the first radio access technology.

23. An apparatus for wireless communication, comprising:

a processor;

memory coupled with the processor; and instructions stored in the memory and executable by the processor to cause the apparatus to:

receive, from a wireless modem, a broadcast session notification message that indicates a set of broadcast service parameters associated with a broadcast service that is provided via the wireless modem using a first wireless network that uses a first radio access technology;

mapping, based at least in part on one or more broadcast service parameters of the set of broadcast service parameters, the broadcast service to a background broadcast access category queue at a scheduler of a second wireless network that uses a second radio access technology, wherein the first wireless network is different than the second wireless network, and the first radio access technology is different than the second radio access technology;

receive, from the wireless modem, broadcast data and a broadcast indication associated with the broadcast service that is provided using the first wireless network and the first radio access technology, wherein the broadcast data is to be transmitted to a plurality of clients via the scheduler of the second wireless network using the second radio access technology; and buffering, based at least in part on the broadcast indication, the broadcast data in the background broadcast access category queue for transmission to the plurality of clients via the second wireless network in accordance with one or more threshold values corresponding to an amount of broadcast data in the background broadcast access category queue.

24. The apparatus of claim 23, wherein the instructions are further executable by the processor to cause the apparatus to:

receive, from a first subset of the plurality of clients, a solicitation request for the broadcast service; and add each client of the first subset of the plurality of clients to a solicited client list.

25. The apparatus of claim 24, wherein the instructions are further executable by the processor to cause the apparatus to:

determine that an amount of data in the background broadcast access category queue exceeds a first threshold value;

transmit the broadcast data from the background broadcast access category queue to the first subset of the plurality of clients that are included on the solicited client list; and drop the broadcast data from the background broadcast access category queue for a second subset of the plurality of clients that are not included on the solicited client list.

26. The apparatus of claim 25, wherein the instructions are further executable by the processor to cause the apparatus to:

determine that the amount of data in the background broadcast access category queue exceeds a second threshold value, wherein the second threshold value is greater than the first threshold value;

drop all broadcast data from the background broadcast access category queue for each of the plurality of clients; and transmit an indication to the wireless modem to drop the broadcast service for the plurality of clients.

27. The apparatus of claim 26, wherein the instructions are further executable by the processor to cause the apparatus to:

receive, subsequent to dropping all broadcast data, subsequent broadcast data associated with the broadcast service;

determine that the amount of data in the background broadcast access category queue is less than a third threshold value, wherein the third threshold value is greater than the first threshold value and less than the second threshold value; and resume transmission of the broadcast data from the background broadcast access category queue to the first subset of the plurality of clients that are included on the solicited client list.

28. The apparatus of claim 25, wherein the instructions are further executable by the processor to cause the apparatus to:

determine, subsequent to dropping the broadcast data from the background broadcast access category queue for the second subset of the plurality of clients, that the amount of data in the background broadcast access category queue is less than a fourth threshold value, wherein the fourth threshold value is less than the first threshold value; and resume transmission of the broadcast data from the background broadcast access category queue to each client of the plurality of clients.

29. The apparatus of claim 23, wherein the one or more broadcast service parameters include one or more of a quantity of clients of the second wireless network, a quantity of clients that have solicited the broadcast service, one or more quality of service parameters associated with the broadcast service, or a data rate target of the broadcast service.

30. The apparatus of claim 29, wherein the instructions are further executable by the processor to cause the apparatus to:

determine the one or more threshold values for transmitting the broadcast data to one or more of the plurality of clients based at least in part on the one or more broadcast service parameters.

* * * * *